(12) United States Patent
Sun

(10) Patent No.: US 11,381,287 B2
(45) Date of Patent: Jul. 5, 2022

(54) NR UPLINK CODEBOOK CONFIGURATION METHOD AND RELATED DEVICE

(71) Applicant: HUAWEI TECHNOLOGIES CO., LTD., Guangdong (CN)

(72) Inventor: Yanliang Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 182 days.

(21) Appl. No.: 16/623,291

(22) PCT Filed: Aug. 11, 2017

(86) PCT No.: PCT/CN2017/097075
§ 371 (c)(1),
(2) Date: Dec. 16, 2019

(87) PCT Pub. No.: WO2018/227742
PCT Pub. Date: Dec. 20, 2018

(65) Prior Publication Data
US 2020/0220590 A1 Jul. 9, 2020

(30) Foreign Application Priority Data
Jun. 16, 2017 (CN) .......................... 201710458921.6

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0626* (2013.01); *H04L 5/0051* (2013.01); *H04L 25/0226* (2013.01); *H04L 27/2636* (2013.01)

(58) Field of Classification Search
CPC ... H04B 7/0456; H04B 7/0626; H04L 5/0051; H04L 25/0226; H04L 24/2636
See application file for complete search history.

(56) References Cited

U.S. PATENT DOCUMENTS

2013/0058424 A1 3/2013 Enescu et al.
2018/0262250 A1 9/2018 Kim et al.

FOREIGN PATENT DOCUMENTS

CN 104702543 A 6/2015
CN 106464334 A 2/2017
(Continued)

OTHER PUBLICATIONS

R1-1704719 Intel Corporation,"On Codebook Based UL Transmission", 3GPP TSG-RSN WG1 #88bis ,Spokane, USA, Apr. 3-7, 2017, total 4 pages.
(Continued)

*Primary Examiner* — Brian P Cox

(57) ABSTRACT

This application provides an NR uplink codebook configuration method and a related device. The method may include: receiving, by a network device, reference transmission unit configuration information reported by a terminal, where the reference transmission unit configuration information includes: a quantity N of transmission units of the terminal, a quantity M of groups into which the N transmission units are divided, and a quantity of transmission units included in each group; determining transmission port configuration information of the terminal based on the reference transmission unit configuration information; receiving reference codebook configuration information reported by the terminal; determining a codebook type of the terminal based on the reference codebook configuration information; and sending the transmission port configuration information and the codebook type to the terminal. In this application, two-stage codebooks or single codebooks adapted to different antenna array forms on a terminal side in an NR scenario can be designed.

20 Claims, 9 Drawing Sheets

(51) Int. Cl.
*H04L 5/00* (2006.01)
*H04L 25/02* (2006.01)
*H04L 27/26* (2006.01)

(56) References Cited

FOREIGN PATENT DOCUMENTS

| CN | 110679125 A | 1/2020 |
|---|---|---|
| WO | 2011/124012 A1 | 10/2011 |
| WO | 2015060681 A1 | 4/2015 |
| WO | 2017039166 A1 | 3/2017 |

OTHER PUBLICATIONS

R1-1707113 ZTE,"Codebook based UL transmission", 3GPP TSG RAN WG1 Meeting #89, Hangzhou, P.R. China May 15-19, 2017, total 5 pages.

R1-1709206 Huawei, HiSilicon,"Codebook based transmission for UL MIMO", 3GPP TSG RAN WG1 Meeting #89 , Hangzhou, China, May 15-19, 2017, total 10 pages.

R1-1708693 Ericsson,"On scalable codebook for up to 32 ports", 3GPP TSG-RAN WG1 #89, Hangzhou, China, May 15-19, 2017, total 5 pages.

R1-1700129 ZTE,"On Type I codebook design for NR MIMO", 3GPP TSG RAN WG1 NR Ad-Hoc Meeting, Spokane, USA, Jan. 16-20, 2017, total 7 pages.

Chairman notes, RAN1 #89 Chairman''s Notes RAN1_89_final, 3GPP TSG RAN WG1 Meeting #89, Hangzhou, P.R. China May 15-19, 2017, total 143 pages.

Final_Minutes_report_RAN1#88b_v100 R1-1708890 MCC Support, "Final Report of 3GPP TSG RAN WG1 #88bis v1.0.0 (Spokane, USA, Apr. 3-7, 2017)", 3GPP TSG RAN WG1 Meeting #89,Hangzhou, China, May 15-19, 2017, total 154 pages.

International Search Report for PCT/CN2017/097075 dated Feb. 26, 2018, 6 pages.

R1-1707349 Intel Corporation, "On Codebook Based UL Transmission", 3GPP TSG-RAN WG1 #89 ,Hangzhou, China, May 15-19, 2017, total 5 pages.

Low-correlation 4-antenna (port) array
0-6 GHz

High-correlation 4-antenna (port) array
6-100 GHz
Single-sided panel

High-correlation 4-antenna (port) array
6-100 GHz
Single-sided panel

High-correlation 4-antenna (port) array
6-100 GHz
Double-sided panel

High-correlation 4-antenna (port) array
6-100 GHz
Double-sided panel

High-correlation 4-antenna (port) array
6-100 GHz
Double-sided panel

NR UPLINK CODEBOOK CONFIGURATION METHOD AND RELATED DEVICE

This application is a national stage of International Application No. PCT/CN2017/097075, filed on Aug. 11, 2017, which claims priority to Chinese Patent Application No. 201710458921.6, filed with the Chinese Patent Office on Jun. 16, 2017. Both of the aforementioned applications are hereby incorporated by reference in their entireties.

TECHNICAL FIELD

This application relates to the field of 5G new radio access technologies (NR), and codebook design and configuration, and in particular, to an NR uplink codebook configuration method and a related device.

BACKGROUND

In a multiple-input multiple-output (multiple-input multiple-output, MIMO) technology, a plurality of antennas are used to concurrently send a plurality of streams of data, so as to obtain an extra spatial multiplexing gain. To better use a complex channel spatial characteristic, a transmit data stream is usually precoded, and a signal is preprocessed at a transmit end by using channel state information, so as to improve signal transmission quality.

In a precoding technology, a receive vector may be represented as $R=HWx+\theta$, where H represents a spatial channel matrix, W represents a precoding matrix, x represents a transmit signal vector, and $\theta$ represents a noise vector. The precoding matrix W is an $I \times N_{layer}$ matrix, where I represents a quantity of transmission ports, and $N_{layer}$ represents a quantity of input symbol streams and is usually referred to as a transmission rank or a quantity of transmission layers. The precoding matrix W can be used to precode data streams at $N_{layer}$ transmission layers, and map precoded data streams to I transmission ports, so that a system can achieve specific performance (a minimum bit error rate, a maximum channel capacity, or the like). The precoding matrix W may be obtained from a codebook by using a matrix index, and the codebook is a finite matrix set. $N_{layer} \leq I$.

The MIMO technology is introduced in LTE-A (long term evolution-advanced). In an LTE-A uplink MIMO system, two or four transmission ports may be configured for a terminal. During LTE-A uplink data transmission, a data stream is precoded by using a single codebook. A precoding scheme of the single codebook is applicable to only a scenario with two or four transmission ports, and has poor performance.

In an LTE-A downlink MIMO system, an 8×8 downlink MIMO technology is introduced, and a quantity of downlink transmission ports is increased to 8. It is defined in a 3GPP standard that downlink data is precoded by using a structure of a two-stage codebook. A precoding scheme of the two-stage codebook is applicable to a scenario with two, four, or eight transmission ports.

A principle for performing precoding by using the structure of the two-stage codebook is as follows: The precoding matrix W is obtained by multiplying two matrices $W_1$ and $W_2$, where $W_1$ represents a wideband/long-term channel characteristic, $W_2$ represents a narrowband/short-term channel characteristic, and $W_1$ and $W_2$ belong to different codebooks. For example, in a scenario with eight transmission ports, in a first stage, the eight transmission ports are divided into two groups, and each group includes four transmission ports. A network device performs precoding by using $W_1$, to respectively map data streams to the four transmission ports in each of the two groups. In a second stage, each of the two groups of transmission ports is considered as a new virtualization port, to be specific, in the second stage, it may be considered that there are two transmission ports; and precoding is performed by using $W_2$, to map the data streams on which precoding has been performed in the first stage to the two transmission ports in the second stage.

Currently, the MIMO technology is also introduced in NR, and an NR uplink codebook design solution becomes an attention focus.

SUMMARY

This application provides an NR uplink codebook configuration method and a related device, to design, for an NR communications system, two-stage codebooks or single codebooks adapted to different antenna array forms on a terminal side in an NR scenario, and flexibly configure different terminals.

According to a first aspect, this application provides an NR uplink codebook configuration method, where the method is applied to a network device side. The method may include: receiving, by a network device, reference transmission unit configuration information reported by a terminal; determining transmission port configuration information of the terminal based on the reference transmission unit configuration information; receiving reference codebook configuration information reported by the terminal; determining a codebook type of the terminal based on the reference codebook configuration information; and sending the transmission port configuration information and the codebook type to the terminal.

According to a second aspect, this application provides an NR uplink codebook configuration method, where the method is applied to a terminal side. The method may include: reporting, by a terminal, reference transmission unit configuration information and reference codebook configuration information to a network device; and receiving transmission port configuration information and a codebook type of the terminal that are delivered by the network device, where the transmission port configuration information is determined by the network device based on the reference transmission unit configuration information, and the codebook type is determined by the network device based on the reference codebook configuration information.

The reference transmission unit configuration information includes: a quantity N of transmission units of the terminal, a quantity M of groups into which the N transmission units are divided, and a quantity of transmission units included in each group.

When $M \neq 1$ and $M \neq N$, the network device may design and configure a two-stage codebook for the terminal. The following provides a brief description.

The reference codebook configuration information reported by the terminal to the network device may include a one-stage codebook reference type and a two-stage codebook reference type, or one-stage correlation and two-stage correlation.

The transmission port configuration information delivered by the network device to the terminal may include: a quantity n of transmission ports configured for the terminal, a quantity m of groups into which the n transmission ports are divided, and a quantity of transmission ports included in each group.

The codebook type delivered by the network device to the terminal includes a one-stage codebook type and a two-stage codebook type. There are two manners for determining the one-stage codebook type and the two-stage codebook type by the network device based on the reference codebook configuration information reported by the terminal. In a first manner, it is determined that the one-stage codebook type is a codebook type in the one-stage codebook reference type and the two-stage codebook type is a codebook type in the two-stage codebook reference type. In a second manner, when the one-stage correlation is high, it is determined that the one-stage codebook type is a discrete fourier transform (discrete fourier transform, DFT) codebook type; or when the one-stage correlation is medium or low, it is determined that the one-stage codebook type is a phase codebook type, a Householder codebook type, or a first combination codebook type; and when the two-stage correlation is high, it is determined that the two-stage codebook type is a DFT codebook type; or when the two-stage correlation is medium or low, it is determined that the two-stage codebook type is a phase codebook type, a Householder codebook type, or a first combination codebook type.

Herein, the DFT codebook type, the Householder codebook type, the phase codebook type, and the first combination codebook type all include codebooks of different quantities of transmission ports.

When M=1 or M=N, the network device may design and configure a single-stage codebook for the terminal. The following provides a brief description.

The reference codebook configuration information reported by the terminal to the network device may include a single-stage codebook reference type or single-stage correlation.

The transmission port configuration information delivered by the network device to the terminal may include a quantity n of transmission ports configured for the terminal.

The codebook type delivered by the network device to the terminal includes a single-stage codebook type. There are two manners for determining the single-stage codebook type based on the reference codebook configuration information reported by the terminal. In a first manner, it is determined that the single-stage codebook type is a codebook type in the single-stage codebook reference type. In a second manner, when the single-stage correlation is high, it is determined that the single-stage codebook type is a DFT codebook type; or when the single-stage correlation is medium or low, it is determined that the single-stage codebook type is a phase codebook type, a Householder codebook type, or a first combination codebook type.

In an optional embodiment, the network device may further deliver a specific codebook parameter to the terminal, so that the terminal determines a specific precoding codebook based on the codebook type and the corresponding codebook parameter.

In an optional embodiment, the network device may further configure a subband width of each stage for the single-stage codebook or the two-stage codebook based on current determining of a channel propagation environment. The subband width of each stage may be configured by the network device and/or specified in a protocol.

In this application, after the network device sends the transmission port configuration information and the codebook type to the terminal, a codebook used to precode data is determined between the terminal and the network device. Before data transmission is performed between the network device and the terminal, the network device sends indication information to the terminal, so that the terminal finds a specific precoding matrix in the codebook to precode data.

When the network device configures the two-stage codebook for the terminal, the indication information sent by the network device to the terminal includes one-stage indication information and two-stage indication information. The one-stage indication information may include a precoding matrix indicator and a rank indicator that correspond to each of the m groups of transmission ports or a precoding matrix indicator that corresponds to each of the m groups of transmission ports. The two-stage indication information may include a precoding matrix indicator and a rank indicator that correspond to the m groups of transmission ports.

Herein, optionally, indication intervals at which the network device sends the one-stage indication information and the two-stage indication information to the terminal are different. In other words, sending timings (timing) for the network device to deliver the one-stage indication information and the two-stage indication information to the terminal are different, and the network device may configure, based on a current channel propagation environment, the sending timing, that is, a first indication interval $T_1$, for delivering the one-stage indication information, and the sending timing, that is, a second indication interval $T_2$, for delivering the two-stage indication information. $T_1$ and $T_2$ may be configured by the network device and/or specified in a protocol.

When the network device configures the single-stage codebook for the terminal, the indication information sent by the network device to the terminal includes single-stage indication information. The single-stage indication information may include a precoding matrix indicator and a rank indicator. The single-stage indication information enables the terminal to determine a precoding matrix used to precode the n transmission ports.

In an optional embodiment, the N transmission units reported by the terminal to the network device may belong to a same panel or a plurality of panels in a same direction. When the terminal includes transmission units that belong to panels in different directions, the terminal reports the reference transmission unit configuration information and the reference codebook configuration information to the network device in each direction, and the network device also configures the transmission port configuration information and the codebook type for the terminal in each direction.

In an optional embodiment, all transmission ports configured by the network device for the terminal are sounding reference signal (sounding reference signal, SRS) ports used to measure channel state information (channel stage information, CSI).

According to a third aspect, this application provides a network device, configured to perform the NR uplink codebook configuration method described in the first aspect. The network device may include: a memory, and a processor, a transmitter, and a receiver that are coupled to the memory, where the transmitter is configured to send a signal to a terminal or another network device; the receiver is configured to receive a signal sent by the terminal or the another network device; the memory is configured to store code for implementing the NR uplink codebook configuration method described in the first aspect; and the processor is configured to execute program code stored in the memory, to be specific, to perform the NR uplink codebook configuration method provided in any one of the first aspect or the possible implementations of the first aspect.

According to a fourth aspect, this application provides a terminal, configured to perform the NR uplink codebook configuration method described in the second aspect. The terminal may include: a memory, and a processor, a transmitter, and a receiver that are coupled to the memory, where the transmitter is configured to send a signal to a network device or another terminal; the receiver is configured to receive a signal sent by the network device or the another terminal; the memory is configured to store code for implementing the NR uplink codebook configuration method described in the second aspect; and the processor is configured to execute program code stored in the memory, to be specific, to perform the NR uplink codebook configuration method provided in any one of the second aspect or the possible implementations of the second aspect.

According to a fifth aspect, a network device is provided. The network device includes a plurality of functional modules, configured to correspondingly perform the method provided in any one of the first aspect or the possible implementations of the first aspect.

According to a sixth aspect, a terminal is provided. The terminal includes a plurality of functional modules, configured to correspondingly perform the method provided in any one of the second aspect or the possible implementations of the second aspect.

According to a seventh aspect, this application provides a computer-readable storage medium, where the computer-readable storage medium stores an instruction, and when the instruction is run on a computer, the computer is enabled to perform the method according to any one of the first aspect or the possible implementations of the first aspect.

According to an eighth aspect, this application provides a computer program product including an instruction, where when the computer program product is run on a computer, the computer is enabled to perform the method according to any one of the first aspect or the possible implementations of the first aspect.

According to a ninth aspect, this application provides a computer-readable storage medium, where the computer-readable storage medium stores an instruction, and when the instruction is run on a computer, the computer is enabled to perform the method according to any one of the second aspect or the possible implementations of the second aspect.

According to a tenth aspect, this application provides a computer program product including an instruction, where when the computer program product is run on a computer, the computer is enabled to perform the method according to any one of the second aspect or the possible implementations of the second aspect.

By implementing this application, two-stage codebooks or single codebooks adapted to different antenna array forms on a terminal side in an NR scenario can be designed for an NR communications system.

DESCRIPTION OF EMBODIMENTS

Figure 1A:
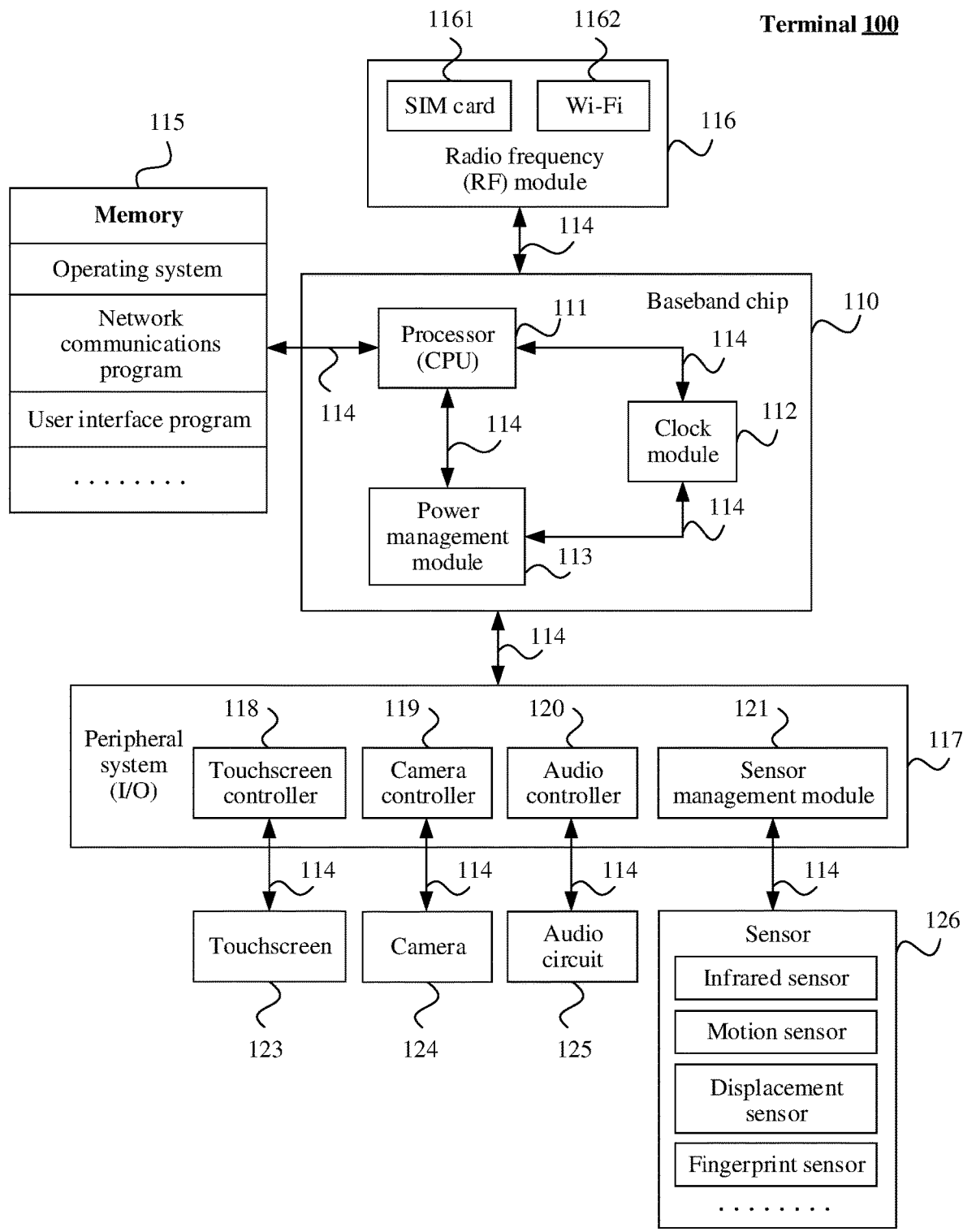
FIG. 1A is a hardware structural diagram of a terminal 100 according to this application.

To better understand a method in this application, a hardware structure diagram of a terminal 100 according to this application is first described, and the terminal 100 may be applied to a 5G NR system. Referring to FIG. 1A, the terminal 100 may include a baseband chip 110, a memory 115 (one or more computer-readable storage media), a radio frequency (RF) module 116, and a peripheral system 117. These components may communicate on one or more communications buses 114.

The peripheral system 117 is mainly configured to implement a function of interaction between the terminal 100 and a user/external environment, and mainly includes an input/output apparatus of the terminal 100. In specific implementation, the peripheral system 117 may include a touchscreen controller 118, a camera controller 119, an audio controller 120, and a sensor management module 121. Each controller may be coupled to a peripheral device (for example, a touchscreen 123, a camera 124, an audio circuit 125, or a sensor 126) corresponding to the controller. It should be noted that the peripheral system 117 may further include another I/O peripheral device.

The baseband chip 110 may integrally include one or more processors 111, a clock module 112, and a power management module 113. The clock module 112 integrated into the baseband chip 110 is mainly configured to generate, for the processor 111, a clock required for data transmission and time sequence control. The power management module 113 integrated into the baseband chip 110 is mainly configured to provide a stable high-precision voltage for the processor 111, the radio frequency module 116, and the peripheral system.

The radio frequency (RF) module 116 is configured to receive and transmit a radio frequency signal, and is mainly integrated with a receiver and a transmitter of the terminal 100. The radio frequency (RF) module 116 communicates with a communications network and another communications device by using a radio frequency signal. In specific implementation, the radio frequency (RF) module 116 may include but is not limited to: an antenna system, an RF receiver, one or more amplifiers, a tuner, one or more oscillators, a digital signal processor, a CODEC chip, a SIM card, a storage medium, and the like. In some embodiments, the radio frequency (RF) module 116 may be implemented on a separate chip.

Figure 1B:
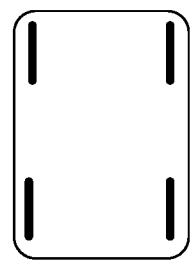
FIG. 1B is a schematic diagram of some possible antenna array forms included in an antenna system of a terminal according to this application.
Figure 1B:
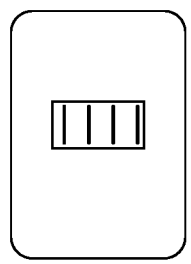
Figure 1B:
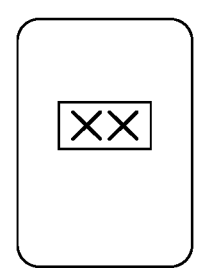
Figure 1B:
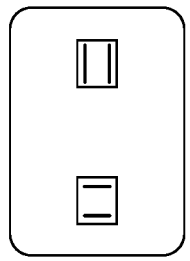
Figure 1B:
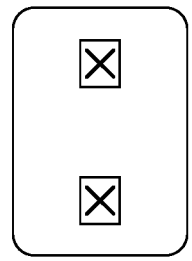
Figure 1B:
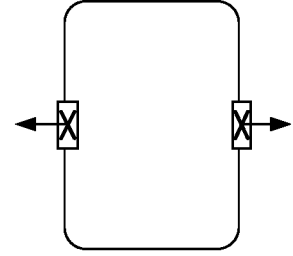

The antenna system included in the radio frequency module 116 has a plurality of forms. FIG. 1B shows some possible antenna array forms included in an antenna system of a terminal according to this application. An antenna array includes a plurality of antenna array elements. It can be learned from FIG. 1B that, in different frequency bands, antenna array forms may be different, and in a same frequency band, antenna array forms may also be different. In FIG. 1B, a first diagram shows a possible antenna array form in a low frequency band, and a second diagram to a sixth diagram show several possible antenna array forms in a high frequency band. Antenna arrays of the terminal may be located on a same panel, or may be located on different panels.

The memory 115 is coupled to the processor 111, and is configured to store various software programs and/or a plurality of sets of instructions. In specific implementation, the memory 115 may include a high-speed random access memory, or may include a non-volatile memory, for example, one or more magnetic storage devices, one or more flash memory devices, or another non-volatile solid state storage device. The memory 115 may store an operating system (hereinafter referred to as a system), for example, an embedded operating system such as ANDROID, IOS, WINDOWS, or LINUX. The memory 115 may further store a network communications program. The network communications program may be configured to communicate with one or more additional devices, one or more terminal devices, or one or more network devices. The memory 115 may further store a user interface program. The user interface program may vividly display content of an application program by using a graphical operation interface, and receive control operations of a user for the application program by using input controls such as a menu, a dialog box, and a key.

It should be understood that the terminal 100 is merely an example provided in this application. In addition, the terminal 100 may include more or fewer components than shown components, or may combine two or more components, or may have different component configurations.

With reference to the baseband chip 110 and the radio frequency module 116 in the foregoing terminal, the following describes concepts such as a transmission port, a transmission unit, a radio frequency processing unit, an antenna array, and an array element that are mentioned in this application.

Figure 1C:
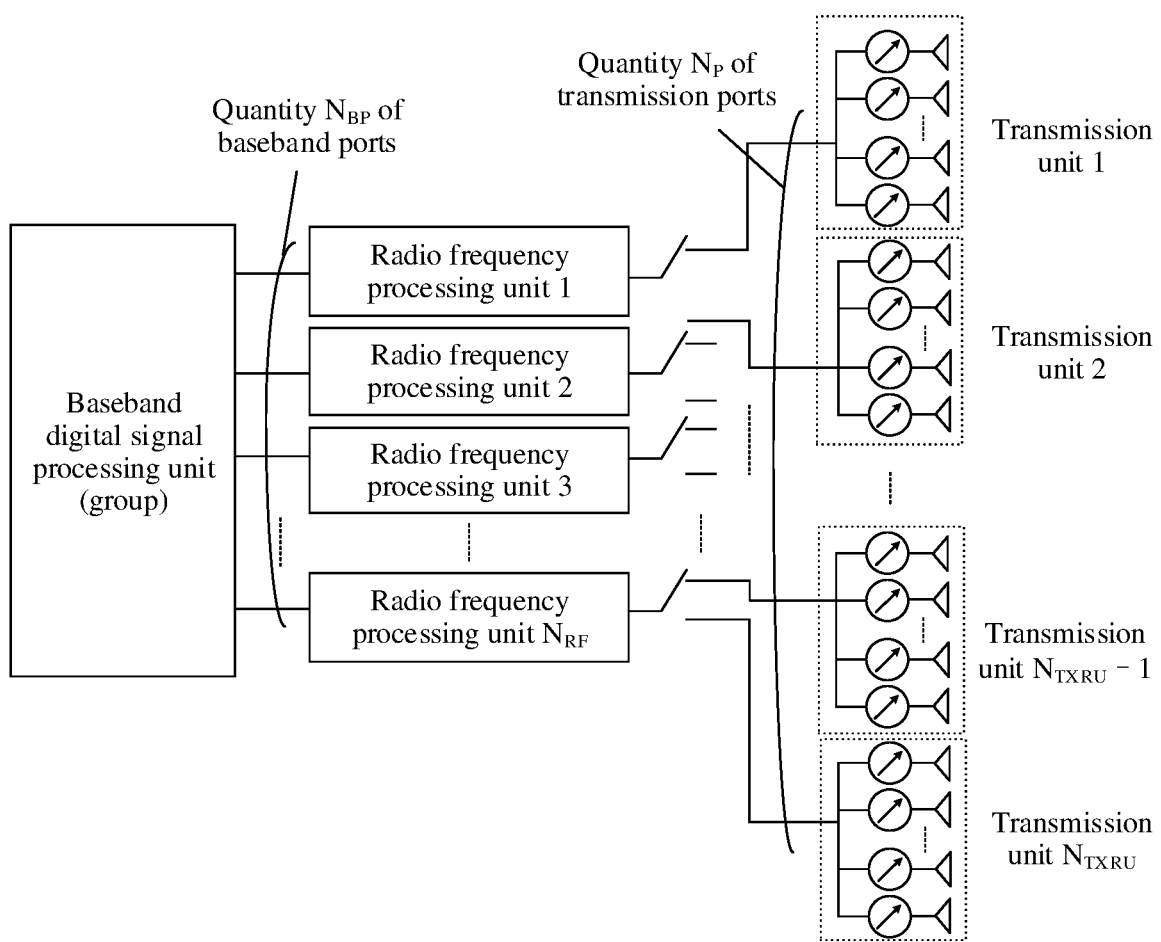
FIG. 1C is an implementation block diagram of a radio transmitter according to this application.

FIG. 1C is an implementation block diagram of a radio transmitter. The radio transmitter mainly includes a baseband chip and a radio frequency module, and may be disposed in a network device or a terminal device.

As shown in the figure, the baseband chip includes a baseband digital signal processing unit, and the baseband digital signal processing unit has $N_{BP}$ output ports used to output $N_{BP}$ baseband signals that have undergone modulation and domain conversion.

The radio frequency module includes $N_{RF}$ radio frequency processing units. The $N_{RF}$ radio frequency processing units perform processing such as up-conversion and power amplification on the output $N_{BP}$ baseband signals, and map the $N_{BP}$ baseband signals to $N_{TXRU}$ physical transmission units (transmission RF unit, TXRU).

One physical transmission unit includes one or more antenna array elements. In one transmission unit, polarization directions of antenna array elements are the same, and antenna array elements having different polarization directions belong to different transmission units. When there are a plurality of antenna array elements in one physical transmission unit, each antenna array element may be connected to one analog phase shifter. When a signal is mapped to the physical transmission unit, the analog phase shifter may be configured to shift a phase of the signal, and output the phase-shifted signal to the plurality of antenna array elements.

A relationship between transmission units is measured through correlation. When a distance between antenna array elements included in a transmission unit is very small (for example, half of a wavelength), correlation between corresponding transmission units are high. When a distance between antenna array elements is large enough (several times a wavelength), or polarization directions of antenna array elements are different, correlation between corresponding transmission units is low or medium. An objective of setting two correlation levels low and medium is to distinguish between low correlation caused by different polarization directions and low correlation caused by a large distance between antennas.

Optionally, a group of antenna selection switches may be disposed between a radio frequency processing unit and transmission units, and is a group of digital selection switches. An output signal of the radio frequency processing unit may be mapped to different transmission units by controlling digital signals.

A transmission port is a logical concept, and refers to a logical port or a group of logical ports used for data transmission. In this application, a quantity of transmission ports may be equal to an actual quantity of transmission units.

In an NR uplink MIMO system, because NR covers a wide frequency band, a quantity of transmission ports configurable on a terminal side may vary in different frequency bands. None of existing codebook design solutions can be applied to an NR usage scenario. Details are described in the following.

In an NR 0-6 GHz frequency band (sub-6 GHz), an antenna array on a terminal side is limited by a size of a terminal, and a corresponding quantity of transmission ports configurable on the terminal side may be 2, 3, or 4. In this case, a single codebook design solution is suitable. However, an existing LTE-A uplink single codebook design solution is applicable to only a scenario with two or four transmission ports, and cannot deal with diversity of an antenna array on a terminal side in NR.

In an NR 6-100 GHz frequency band (above-6 GHz), an antenna array on a terminal side may have more possible forms than that in the 0-6 GHz frequency band, and a corresponding quantity of transmission ports configurable on the terminal side may be 2, 3, 4, 5, 6, 7, 8, or the like. In this case, a two-stage codebook design solution is suitable. However, an existing LTE-A downlink dual-codebook design solution cannot be directly applied to an NR uplink codebook, and there are mainly the following two reasons.

First, in the existing LTE-A downlink dual-codebook design solution, transmission ports are always divided into two groups in a first stage. However, in NR, an antenna array form on a terminal side needs to be considered in design of an uplink codebook, and a fixed grouping manner cannot well match a plurality of antenna array forms on the terminal side.

Then, in existing LTE-A, a quantity of downlink transmission ports may be 2, 4, or 8, and correspondingly, a 2-port, 4-port, or 8-port codebook design solution is used. However, in NR uplink transmission, when carrier aggregation (CA) is introduced, a quantity of transmission ports that corresponds to each band may not be a power of 2 or an integer multiple of 4, and the quantity of transmission ports that corresponds to each band may be 3, 5, 6, 7, or the like.

Figure 2:
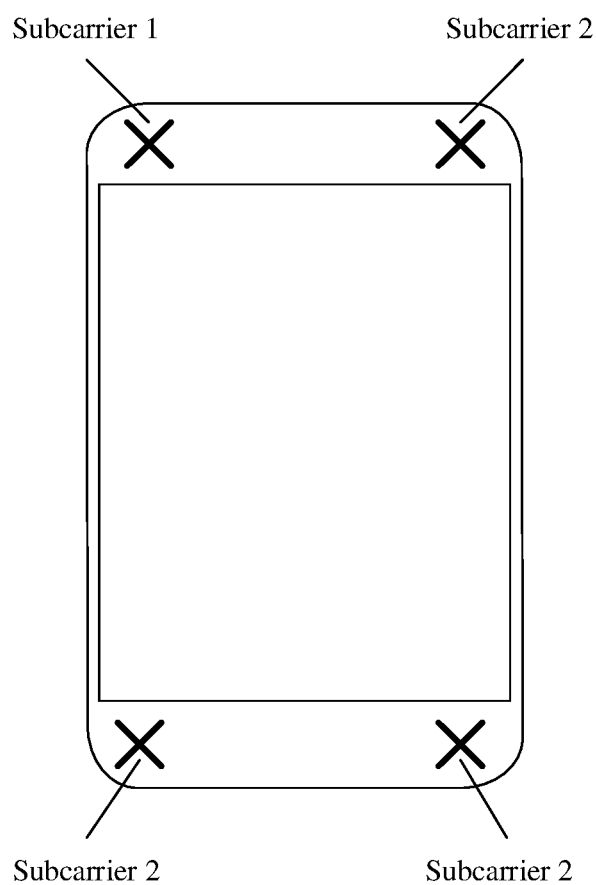
FIG. 2 is a schematic diagram of transmission unit allocation according to this application.

A scenario in which two carriers: a band 1 and a band 2 are aggregated is used as example for description. Referring to FIG. 2, when four transmission units are configured for a terminal, one transmission unit may be allocated to a subcarrier 1 (the band 1), and three transmission units may be allocated to a subcarrier 2 (the band 2). When six transmission units are configured for the terminal, four transmission units may be allocated to the band 2, and two transmission units may be allocated to the band 1; or one transmission unit may be allocated to the band 1, and five transmission units may be allocated to the band 2. When eight transmission units are configured for the terminal, one transmission unit may be allocated to the band 1, and seven transmission units may be allocated to the band 2; or two transmission units may be allocated to the band 1, and six transmission units may be allocated to the band 2. It may be learned from the foregoing description that in a carrier aggregation scenario, a quantity of transmission ports that corresponds to each band may not be a power of 2 or an integer multiple of 4, and a precoding operation is separately performed for each band. Therefore, a codebook design needs to be adapted to a quantity of transmission ports that may correspond to each band, to be specific, the codebook design needs to be adapted to a case in which the quantity of transmission ports may not be a power of 2 or an integer multiple of 4.

Because none of the existing codebook design solutions is applicable to NR uplink data transmission, this application provides an uplink codebook configuration method for NR. The method in this application can match different antenna array forms on a terminal side, and is applicable to scenarios with different quantities of transmission ports on the terminal side.

The following describes several codebook types mentioned in this application: a Discrete Fourier Transform (DFT) codebook type, a phase codebook type, a Householder codebook type, a port selection codebook type, and a first combination codebook type. These codebook types may be used by a terminal as optional codebook prototypes, and are reported to a base station as terminal capabilities. Each codebook type is applicable to only a transmission port corresponding to a transmission unit group having a specific correlation level. It should be noted that a codebook type configurable for the terminal is not limited to the foregoing codebook types. The following describes these codebook prototypes in detail.

A first type is a DFT codebook type. This is a codebook of the DFT codebook type, and is obtained based on a DFT matrix. Different quantities of transmission ports correspond to different DFT codebooks. For example, y transmission ports correspond to a y-port DFT codebook, and data streams may be mapped to the y transmission ports. Generally, $y \geq 2$.

Transmission units with high correlation may generate a series of beams with good directionality by using a DFT codebook, so that data transmission can be better implemented. Therefore, the DFT codebook is more applicable to a scenario in which data streams are mapped to transmission ports corresponding to the transmission units with high correlation.

Referring to Table 1, a specific implementation form of the y-port DFT codebook may be as follows.

TABLE 1

| y-port DFT codebook | | | |
|---|---|---|---|
| Precoding matrix index | Rank = 1 | Rank = 2 | Rank = y |
| 0 | $A_0$ | $B_0$ | ... $C_0$ |
| 1 | $A_1$ | $B_1$ | ... $C_1$ |
| 2 | $A_2$ | $B_2$ | ... $C_2$ |
| ... | ... | ... | ... |
| L − 1 | $A_{L-1}$ | $B_{L-1}$ | ... $C_{L-1}$ |

In Table 1, the y-port DFT codebook includes L different precoding matrices $A_0$ to $A_{L-1}$ when the rank=1. Any precoding matrix $A_v$ is a column vector including y elements, $A_v = [1 \ e^{jk\theta} \ e^{j2k\theta} \ \ldots \ e^{j(y-1)k\theta}]^T$, $0 \leq v \leq L-1$, and a value of L may be specified in a standard protocol.

The y-port DFT codebook includes L different precoding matrices $B_0$ to $B_{L-1}$ when the rank=2. Any precoding matrix $B_v$ includes two column vectors, and the two column vectors each may be any one of L column vectors when the rank=1. Specifically, $P_L^2$ (i.e. 2-permutation of L) candidate precoding matrices may be obtained through permutation and combination in a manner of column combination $[A_{x1} \ A_{x2}]$, where $A_{x1} \in \{A_0, A_1, A_2, \ldots, A_{L-1}\}$ and $A_{x2} \in \{A_0, A_1, A_2, \ldots, A_{L-1}\}$; and L candidate precoding matrices may be selected from the $P_L^2$ candidate precoding matrices as the precoding matrices $B_0$ to $B_{L-1}$. There are many selection manners herein. The selection may be performed randomly, or a precoding matrix including two orthogonal column vectors may be selected. This is not limited in this application.

By analogy, the y-port DFT codebook includes L different precoding matrices $C_0$ to $C_{L-1}$ when the rank=y. Any precoding matrix $C_v$ includes y column vectors, and the y column vectors each may be any one of L column vectors when the rank=1. Specifically, $P_L^y$ candidate precoding matrices may be obtained through permutation and combination in a manner of column combination $[A_{x1} \ A_{x2} \ldots A_{xy}]$, where $A_{x1} \in \{A_0, A_1, A_2, \ldots, A_{L-1}\}$, $A_{x2} \in \{A_0, A_1, A_2, \ldots, A_{L-1}\}$, ..., and $A_{xy} \in \{A_0, A_1, A_2, \ldots, A_{L-1}\}$; and L candidate precoding matrices may be selected from the $P_L^y$ candidate precoding matrices as the precoding matrices $C_0$ to $C_{L-1}$. Similar to the foregoing description, there are many selection manners herein. The selection may be performed randomly, or a precoding matrix including orthogonal column vectors $A_{x1} \ A_{x2} \ldots A_{xy}$ may be selected. This is not limited in this application.

Theoretically, the y-port DFT codebook includes a maximum of y orthogonal DFT precoding matrices when the rank is 1, and a value of L usually satisfies $L = O \times y$, where O represents an over-sampling factor. When an antenna array is a two-dimensional planar array, $O = O_1 \times O_2$, where $O_1$ and $O_2$ represent over-sampling factors in a horizontal direction and a vertical direction of the two-dimensional planar array respectively.

The y-port DFT codebook specifically shown above is not limited thereto. The y-port DFT codebook may alternatively be obtained based on a DFT matrix in another manner. This is not limited in this application.

Based on the DFT codebook type, when configuring a DFT codebook for uplink transmission of a terminal, a network device may configure and/or define, based on codebook type configuration, an over-sampling factor, a method for generating a precoding matrix when each rank>1 (for example, selecting precoding matrices with consecutive precoding matrix indexes when the rank=1 for column combination, or selecting orthogonal precoding matrices when the rank=1 for column combination), an optional subset of precoding matrices. After the foregoing configuration and/or definition, when the network device notifies the terminal of the codebook used for uplink transmission, signaling overheads can be reduced.

A second type is a phase codebook type. This is a codebook of the phase codebook type, and is obtained through phase transform. Different quantities of transmission ports correspond to different phase codebooks. For example, y transmission ports correspond to a y-port phase codebook, and data streams may be mapped to the y transmission ports. Generally, 1<y<4.

Transmission units with medium correlation or low correlation may be precoded by using a phase codebook, so as to increase a signal-to-noise ratio, thereby better implementing data transmission. Therefore, the phase codebook is more applicable to a scenario in which data streams are mapped to a transmission port group corresponding to transmission units with medium correlation or low correlation.

Referring to Table 2, Table 2 provides an example of a 2-port phase codebook.

TABLE 2

2-port phase codebook

| Precoding matrix index | Rank = 1 | Rank = 2 |
|---|---|---|
| 0 | $\begin{bmatrix} 1 \\ 1 \end{bmatrix}$ | $\frac{1}{2}\begin{bmatrix} 1 & 1 \\ 1 & -1 \end{bmatrix}$ |
| 1 | $\begin{bmatrix} 1 \\ -j \end{bmatrix}$ | $\frac{1}{2}\begin{bmatrix} 1 & 1 \\ j & -j \end{bmatrix}$ |
| 2 | $\begin{bmatrix} 1 \\ -1 \end{bmatrix}$ | |
| 3 | $\begin{bmatrix} 1 \\ j \end{bmatrix}$ | |

Herein, when the rank=1, there are four corresponding precoding matrices, and each precoding matrix includes two rows and one column.

Based on the foregoing 2-port phase codebook, this application provides a 3-port phase codebook as follows.

TABLE 3

3-port phase codebook

| Precoding matrix index | Rank = 1 | Rank = 2 | Rank = 3 |
|---|---|---|---|
| 0 | $D_0$ | $E_0$ | $F_0$ |
| 1 | $D_1$ | $E_1$ | $F_1$ |
| 2 | $D_2$ | $E_2$ | $F_2$ |
| 15 | $D_{15}$ | $E_{15}$ | $F_{15}$ |

The 3-port phase codebook includes 16 different precoding matrices $D_0$ to $D_{15}$ when the rank=1. Any precoding matrix $D_i$ is a column vector including three elements. The precoding matrix $D_i$ may be obtained by using the following formula:

$$D_i = \begin{bmatrix} x_a[1]X_b \\ x_a[2] \end{bmatrix},$$

where $0 \le i \le 15$.

$x_a[1]$ and $x_a[2]$ are the first element and the second element in a matrix $X_a$ respectively, and a matrix $X_b$ and the matrix $X_a$ each may be any one of the four precoding matrices when the rank=1 in the 2-port phase codebook, to be specific, $X_a \in \{[1\ 1]^T, [1\ -j]^T, [1\ -1]^T, [1\ j]^T\}$ and $X_b \in \{[1\ 1]^T, [1\ -j]^T, [1\ -1]^T, [1\ j]^T\}$. There are 16 precoding matrices calculated by using the foregoing formula, and the 16 precoding matrices are the precoding matrices $D_0$ to $D_{15}$ respectively.

The 3-port phase codebook includes 16 different precoding matrices $E_0$ to $E_{15}$ when the rank=2. Any precoding matrix $E_i$ includes two column vectors, and the two column vectors each may be any one of 16 column vectors when the rank=1. Specifically, $P_{16}^2=240$ candidate precoding matrices may be obtained through permutation and combination of $[D_{x1}\ D_{x2}]$, where $D_{x1} \in \{D_0, D_1, D_2, \ldots, D_{L-1}\}$, and $D_{x2} \in \{D_0, D_1, D_2, \ldots, D_{L-1}\}$; and 16 candidate precoding matrices are selected from the 240 candidate precoding matrices as the precoding matrices $E_0$ to $E_{15}$. In an optional embodiment, bit error rates at a receive end after the 240 precoding matrices are used to precode data may be determined through simulation respectively, and 16 precoding matrices with lowest bit error rates are selected from the 240 precoding matrices. The selection methods in the foregoing example are not limited thereto. In this application, the 16 precoding matrices may alternatively be selected in another manner. This is not limited at all herein.

By analogy, the 3-port phase codebook includes 16 different precoding matrices $F_0$ to $F_{15}$ when the rank=3. Any precoding matrix $F_i$ includes three column vectors, and the three column vectors each may be any one of 16 column vectors when the rank=1. Specifically, $P_{16}^3=3360$ candidate precoding matrices may be obtained through permutation and combination of $[E_{x1}\ E_{x2}\ E_{x3}]$, where $E_{x1} \in \{D_0, D_1, D_2, \ldots, D_{L-1}\}$, $E_{x2} \in \{D_0, D_1, D_2, \ldots, D_{L-1}\}$, and $E_{x3} \in \{D_0, D_1, D_2, \ldots, D_{L-1}\}$; and 16 candidate precoding matrices are selected from the 3360 candidate precoding matrices as the precoding matrices $F_0$ to $F_{15}$.

The 3-port phase codebook specifically shown above is not limited thereto. The 3-port phase codebook may alternatively be obtained based on phase transform in another manner. This is not limited in this application. For example, when the rank=1, 2, or 3 in the 3-port phase codebook, a quantity of included precoding matrices may not be 16, and may be less than 16. In this case, finally used precoding matrices need to be separately determined, by using a corresponding algorithm, from optional precoding matrices when the rank=1, 2, and 3, to constitute the 3-port phase codebook.

A third type is a Householder codebook type, which means that a codebook design manner is based on Householder transform. In the Householder codebook type, there are a plurality of codebooks based on a quantity of transmission ports. For example, based on a y-port Householder codebook, data streams may be mapped to y transmission ports. Generally, $2<y\le4$.

In the prior art, a 4-port Householder codebook is defined. For details, refer to Table 6.3.4.2.3-2 in 3GPPTS 36.211 published by the 3rd Generation Partnership Project in June 2016.

Referring to Table 4, this application provides a 3-port Householder codebook.

TABLE 4

3-port Householder codebook

| Precoding matrix index | $u_n$ | Rank = 1 | Rank = 2 | Rank = 3 |
|---|---|---|---|---|
| 0 | $u_0$ | $W_0^{\{1\}}$ | $W_0^{\{1,2\}}/\sqrt{2}$ | $W_0^{\{1,2,3\}}/\sqrt{3}$ |
| 1 | $u_1$ | $W_1^{\{1\}}$ | $W_1^{\{1,3\}}/\sqrt{2}$ | $W_1^{\{1,2,3\}}/\sqrt{3}$ |
| 2 | $u_2$ | $W_2^{\{1\}}$ | $W_2^{\{2,3\}}/\sqrt{2}$ | $W_2^{\{1,2,3\}}/\sqrt{3}$ |
| 3 | $u_3$ | $W_3^{\{1\}}$ | $W_0^{\{1,2\}}/\sqrt{2}$ | $W_3^{\{1,2,3\}}/\sqrt{3}$ |
| 4 | $u_4$ | $W_4^{\{1\}}$ | $W_0^{\{1,3\}}/\sqrt{2}$ | $W_4^{\{1,2,3\}}/\sqrt{3}$ |
| 5 | $u_5$ | $W_5^{\{1\}}$ | $W_0^{\{1,2\}}/\sqrt{2}$ | $W_5^{\{1,2,3\}}/\sqrt{3}$ |
| 6 | $u_6$ | $W_6^{\{1\}}$ | $W_0^{\{1,3\}}/\sqrt{2}$ | $W_6^{\{1,2,3\}}/\sqrt{3}$ |

TABLE 4-continued 3-port Householder codebook

| Precoding matrix index | $u_n$ | Rank = 1 | Rank = 2 | Rank = 3 |
|---|---|---|---|---|
| 7 | $u_7$ | $W_7^{\{1\}}$ | $W_7^{\{2,3\}}/\sqrt{2}$ | $W_7^{\{1,2,3\}}/\sqrt{3}$ |
| 8 | $u_8$ | $W_8^{\{1\}}$ | $W_8^{\{1,2\}}/\sqrt{2}$ | $W_8^{\{1,2,3\}}/\sqrt{3}$ |
| 9 | $u_9$ | $W_9^{\{1\}}$ | $W_9^{\{1,3\}}/\sqrt{2}$ | $W_9^{\{1,2,3\}}/\sqrt{3}$ |
| 10 | $u_{10}$ | $W_{10}^{\{1\}}$ | $W_{10}^{\{1,2\}}/\sqrt{2}$ | $W_{10}^{\{1,2,3\}}/\sqrt{3}$ |
| 11 | $u_{11}$ | $W_{11}^{\{1\}}$ | $W_{11}^{\{1,3\}}/\sqrt{2}$ | $W_{11}^{\{1,2,3\}}/\sqrt{3}$ |
| 12 | $u_{12}$ | $W_{12}^{\{1\}}$ | $W_{12}^{\{2,3\}}/\sqrt{2}$ | $W_{12}^{\{1,2,3\}}/\sqrt{3}$ |
| 13 | $u_{13}$ | $W_{13}^{\{1\}}$ | $W_{13}^{\{1,2\}}/\sqrt{2}$ | $W_{13}^{\{1,2,3\}}/\sqrt{3}$ |
| 14 | $u_{14}$ | $W_{14}^{\{1\}}$ | $W_{14}^{\{2,3\}}/\sqrt{2}$ | $W_{14}^{\{1,2,3\}}/\sqrt{3}$ |
| 15 | $u_{15}$ | $W_{15}^{\{1\}}$ | $W_{15}^{\{1,2\}}/\sqrt{2}$ | $W_{15}^{\{1,2,3\}}/\sqrt{3}$ |

A total of 16 base vectors $u_0$ to $u_{15}$ are different base vectors, and each base vector is a column of vector, where the column of vector includes three elements. The 16 base vectors may be selected from the following two types of base vectors, where $0 \le i \le 15$.

A first type is: $u_i = [a1\ a2\ a3]^T$, where $a1 \in \{1, e^{2/3\pi}, e^{4/3\pi}\}$, $a2 \in \{1, e^{2/3\pi}, e^{4/3\pi}\}$, and $a3 \in \{1, e^{2/3\pi}, e^{4/3\pi}\}$. In the first type, there are 27 base vectors in total.

A second type is: $u_n = [a1\ a2\ a3]^T$, where $a1 \in \{1, -1\}$, $a2 \in \{1, -1\}$, and $a3 \in \{1, -1\}$. In the second type, there are eight base vectors in total.

When 16 base vectors are selected from the 35 base vectors included in total in the foregoing two types as base vectors in the 3-port Householder codebook, there are a plurality of selection manners. The selection may be performed randomly or may be performed based on a specific algorithm. This is not limited in this application.

Householder transform is performed on a base vector $u_i$ according to the following formula to obtain a mother matrix W (i), an order of W (i) is y×y, and $I_y$ represents an identity matrix of y×y:

$$W(i) = I_y - 2u_i u_i^H / u_i^H u_i$$

A precoding matrix $W_i^{\{col1, col2, col3, \ldots\}}$ is obtained by using the mother matrix W (i). Herein, n represents a precoding mother matrix index; and superscripts {col1, col2, col3, . . . } are an ordered set of column indexes of the mother matrix W (i), and indicate that a (col1)$^{th}$ column, a (col2)$^{th}$ column, a (col3)$^{th}$ column, and so on of the mother matrix are selected to sequentially constitute a new matrix. The new matrix is the required precoding matrix $W_i^{\{col1, col2, col3, \ldots\}}$.

The manner listed above is not limited thereto. The 3-port Householder codebook may alternatively be obtained in another manner. This is not limited in this application.

A fourth type is a port selection codebook type.

For example, when a y-port port selection codebook is used to precode data, any quantity of symbol streams can be directly mapped to p transmission ports, and different input symbol streams are mapped to different transmission ports, where $p \le y$. Herein, it is equivalent to that p transmission ports are selected from y transmission ports, and a data stream is mapped to the p transmission ports.

In a port selection codebook, in elements in each column of a precoding matrix, there are a maximum of p 1s, and the rest are 0s. Such a codebook structure is applicable to the foregoing radio transmitter having an antenna selection switch.

For example, a 2-port port selection codebook may be shown in Table 5, where p=1.

TABLE 5

2-port port selection codebook

| Precoding matrix index | Rank = 1 | Rank = 2 |
|---|---|---|
| 0 | $\begin{bmatrix} 1 \\ 0 \end{bmatrix}$ | $\begin{bmatrix} 1 & 0 \\ 0 & 1 \end{bmatrix}$ |
| 1 | $\begin{bmatrix} 0 \\ 1 \end{bmatrix}$ | $\begin{bmatrix} 0 & 1 \\ 1 & 0 \end{bmatrix}$ |

For example, a 4-port port selection codebook may be shown in Table 6, where p=2.

TABLE 6

4-port port selection codebook

| Precoding matrix index | Rank = 1 | Rank = 2 |
|---|---|---|
| 0 | $\begin{bmatrix} 1 \\ 0 \\ 0 \\ 1 \end{bmatrix}$ | $\begin{bmatrix} 1 & 0 \\ 0 & 1 \\ 0 & 1 \\ 1 & 0 \end{bmatrix}$ |
| 1 | $\begin{bmatrix} 1 \\ 1 \\ 0 \\ 0 \end{bmatrix}$ | $\begin{bmatrix} 1 & 0 \\ 1 & 0 \\ 0 & 1 \\ 0 & 1 \end{bmatrix}$ |
| 2 | $\begin{bmatrix} 1 \\ 0 \\ 1 \\ 0 \end{bmatrix}$ | $\begin{bmatrix} 1 & 0 \\ 0 & 1 \\ 1 & 0 \\ 0 & 1 \end{bmatrix}$ |
| 3 | $\begin{bmatrix} 0 \\ 1 \\ 0 \\ 1 \end{bmatrix}$ | $\begin{bmatrix} 0 & 1 \\ 1 & 0 \\ 0 & 1 \\ 1 & 0 \end{bmatrix}$ |
| 4 | $\begin{bmatrix} 0 \\ 0 \\ 1 \\ 1 \end{bmatrix}$ | $\begin{bmatrix} 0 & 0 \\ 0 & 1 \\ 1 & 1 \\ 1 & 0 \end{bmatrix}$ |
| 5 | $\begin{bmatrix} 0 \\ 1 \\ 1 \\ 0 \end{bmatrix}$ | $\begin{bmatrix} 0 & 1 \\ 1 & 0 \\ 1 & 0 \\ 0 & 1 \end{bmatrix}$ |

A fifth type is a first combination codebook type, to be specific, is a combination codebook of a port selection codebook and a phase codebook. In such a codebook, any precoding matrix $c_k$ has the following form:

when the rank=1, the precoding matrix or $$c_k = \begin{bmatrix} \bar{c}_{d1} \bar{c}_{l,11} \\ \bar{c}_{d2} \bar{c}_{l,21} \end{bmatrix};$$

or when the rank=2, the precoding matrix $$c_k = \begin{bmatrix} \tilde{c}_{d1}\bar{c}_{l,11} & \tilde{c}_{d3}\bar{c}_{l,12} \\ \tilde{c}_{d2}\bar{c}_{l,21} & \tilde{c}_{d4}\bar{c}_{l,22} \end{bmatrix}.$$

By analogy, a form of a precoding matrix when the rank is another value can be obtained.

$\bar{c}_{l,\alpha\beta}$ represents an element in row α and column β in a precoding matrix $\bar{c}_l$ in a phase codebook or a concatenated codebook of phase codebooks. The phase codebook may be the 2-port phase codebook in Table 2, and the concatenated codebook of the phase codebooks is a 2-port codebook.

When $\bar{c}_l$ represents a precoding matrix in the concatenated codebook of the phase codebooks, the precoding matrix $\bar{c}_l$ has the following form: $\bar{c}_l=[\bar{c}_{l1}\ \bar{c}_{l2}]$, where $\bar{c}_{l1}$ and $\bar{c}_{l2}$ each may represent a precoding matrix in the 2-port phase codebook, $\bar{c}_{l1}$ represents a precoding matrix when the rank is equal to 2 in the 2-port phase codebook, and $\bar{c}_{l2}$ represents a precoding matrix when the rank is 1 or 2 in the 2-port phase codebook. Therefore, a rank of the concatenated codebook of the phase codebooks is 3 or 4, and a quantity of ports is 2.

It can be learned that a rank of a precoding matrix $c_k$ in the first combination codebook is equal to a rank corresponding to the precoding matrix $\bar{c}_l$.

$\tilde{c}_{d1}$, $\tilde{c}_{d2}$, $\tilde{c}_{d3}$, and $\tilde{c}_{d4}$ each represent a precoding matrix when a rank is 1 in a $\tilde{y}_d$-port port selection codebook. Specifically, $\tilde{c}_{d1}$, $\tilde{c}_{d2}$, $\tilde{c}_{d3}$, and $\tilde{c}_{d4}$ each may represent a precoding matrix when the rank is 1 in Table 5, or may represent a precoding matrix in the 4-port port selection codebook when p=1, or may represent a single element matrix that includes only one element "1".

It may be learned that a quantity of ports in a first combination codebook is equal to $\tilde{y}_d \times 2$.

Based on the foregoing design solution, the following provides a possible implementation form of the first combination codebook. The first column in Table 5, to be specific, a precoding matrix group when the rank is equal to 1, is selected as a candidate precoding matrix set of $\tilde{c}_{d1}$ and $\tilde{c}_{d2}$. A precoding matrix set when the rank is 1 in Table 2 is selected as a candidate set of $\bar{c}_l$. In this way, a plurality of precoding matrices when the rank is 1 in the first combination codebook may be obtained by separately using the first two bits to indicate precoding matrix indexes of $\tilde{c}_{d1}$ and $\tilde{c}_{d2}$ and using the last two bits to indicate a precoding matrix index of $\bar{c}_l$, as shown in the following table.

TABLE 7

| Precoding matrix index | Rank = 1 |
|---|---|
| 0 | $\left[\begin{bmatrix}1\\0\end{bmatrix}\times 1 \atop \begin{bmatrix}1\\0\end{bmatrix}\times 1\right] = \begin{bmatrix}1\\0\\1\\0\end{bmatrix}$ |
| 1 | $\left[\begin{bmatrix}1\\0\end{bmatrix}\times 1 \atop \begin{bmatrix}1\\0\end{bmatrix}\times j\right] = \begin{bmatrix}1\\0\\j\\0\end{bmatrix}$ |
| 2 | $\left[\begin{bmatrix}1\\0\end{bmatrix}\times 1 \atop \begin{bmatrix}1\\0\end{bmatrix}\times(-1)\right] = \begin{bmatrix}1\\0\\-1\\0\end{bmatrix}$ |
| 3 | $\left[\begin{bmatrix}1\\0\end{bmatrix}\times 1 \atop \begin{bmatrix}1\\0\end{bmatrix}\times(-j)\right] = \begin{bmatrix}1\\0\\-j\\0\end{bmatrix}$ |
| 4 | $\left[\begin{bmatrix}1\\0\end{bmatrix}\times 1 \atop \begin{bmatrix}0\\1\end{bmatrix}\times 1\right] = \begin{bmatrix}1\\0\\0\\1\end{bmatrix}$ |
| 5 | $\left[\begin{bmatrix}1\\0\end{bmatrix}\times 1 \atop \begin{bmatrix}0\\1\end{bmatrix}\times j\right] = \begin{bmatrix}1\\0\\0\\j\end{bmatrix}$ |
| 6 | $\left[\begin{bmatrix}1\\0\end{bmatrix}\times 1 \atop \begin{bmatrix}0\\1\end{bmatrix}\times(-1)\right] = \begin{bmatrix}1\\0\\0\\-1\end{bmatrix}$ |
| 7 | $\left[\begin{bmatrix}1\\0\end{bmatrix}\times 1 \atop \begin{bmatrix}0\\1\end{bmatrix}\times(-j)\right] = \begin{bmatrix}1\\0\\0\\-j\end{bmatrix}$ |
| 8 | $\left[\begin{bmatrix}0\\1\end{bmatrix}\times 1 \atop \begin{bmatrix}1\\0\end{bmatrix}\times 1\right] = \begin{bmatrix}0\\1\\1\\0\end{bmatrix}$ |
| 9 | $\left[\begin{bmatrix}0\\1\end{bmatrix}\times 1 \atop \begin{bmatrix}1\\0\end{bmatrix}\times j\right] = \begin{bmatrix}0\\1\\j\\0\end{bmatrix}$ |
| 10 | $\left[\begin{bmatrix}0\\1\end{bmatrix}\times 1 \atop \begin{bmatrix}1\\0\end{bmatrix}\times(-1)\right] = \begin{bmatrix}0\\1\\-1\\0\end{bmatrix}$ |
| 11 | $\left[\begin{bmatrix}0\\1\end{bmatrix}\times 1 \atop \begin{bmatrix}1\\0\end{bmatrix}\times(-j)\right] = \begin{bmatrix}0\\1\\-j\\0\end{bmatrix}$ |
| 12 | $\left[\begin{bmatrix}0\\1\end{bmatrix}\times 1 \atop \begin{bmatrix}0\\1\end{bmatrix}\times 1\right] = \begin{bmatrix}0\\1\\0\\1\end{bmatrix}$ |

TABLE 7-continued

| Precoding matrix index | Rank = 1 |
|---|---|
| 13 | $\left[\begin{bmatrix}0\\1\end{bmatrix}\times 1\right] = \begin{bmatrix}0\\1\\0\\j\end{bmatrix}$ $\left[\begin{bmatrix}0\\1\end{bmatrix}\times j\right]$ |
| 14 | $\left[\begin{bmatrix}0\\1\end{bmatrix}\times 1\right] = \begin{bmatrix}0\\1\\0\\-1\end{bmatrix}$ $\left[\begin{bmatrix}0\\1\end{bmatrix}\times (-1)\right]$ |
| 15 | $\left[\begin{bmatrix}0\\1\end{bmatrix}\times 1\right] = \begin{bmatrix}0\\1\\0\\-j\end{bmatrix}$ $\left[\begin{bmatrix}0\\1\end{bmatrix}\times (-j)\right]$ |

Based on the terminal provided in the foregoing having a plurality of antenna array forms and several codebook types, this application provides an NR uplink codebook design and configuration method. It may be understood that in a carrier aggregation scenario, an operation of the NR uplink codebook configuration method is performed for each subcarrier (band) in this application. Herein, in a subsequent embodiment, the method in this application is described in detail by using an example in which an operation in the method is performed for a subcarrier and it is assumed that a quantity of transmission units configured for the subcarrier is N. Herein, in an optional embodiment, N is a positive integer greater than or equal to 2. In other optional embodiments, N≥3, N≠$2^a$ and/or N≠4b, where a and b are positive integers.

In this application, there are a plurality of physical distribution statuses, on a terminal side, of N transmission units configured on a same subcarrier. A detailed description is provided in the following.

In a first case, the N transmission units are located on a same panel.

Figure 3A:
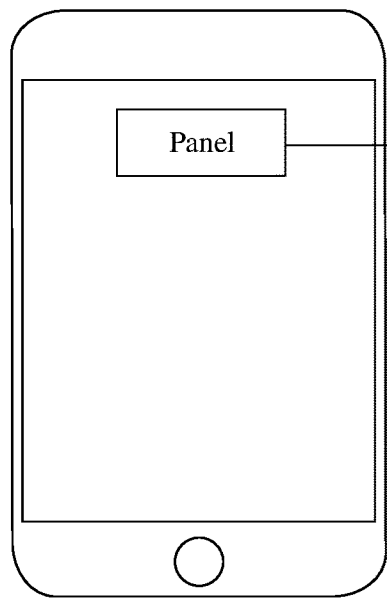
FIG. 3A to FIG. 3C each are a schematic diagram of distribution of transmission units on a terminal side according to this application.

FIG. 3A shows a scenario in which the N transmission units are located on the same panel. In this scenario, after layer mapping is performed on data, the data may be mapped to transmission ports corresponding to the N transmission units at the same time through precoding.

In a second case, the N transmission units are located on a plurality of panels, and directions of the plurality of panels are the same.

Figure 3B:
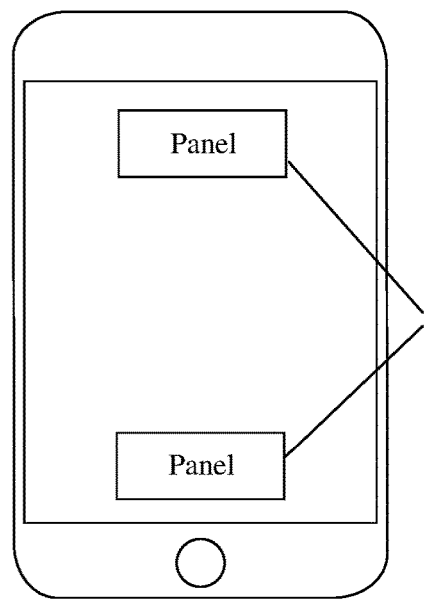

FIG. 3B shows a scenario in which the N transmission units are located on the plurality of panels whose directions are the same. In this scenario, after layer mapping is performed on data, the data may be mapped to transmission ports corresponding to the N transmission units at the same time through precoding.

In a third case, the N transmission units are located on a plurality of panels, and directions of the plurality of panels are different.

Figure 3C:
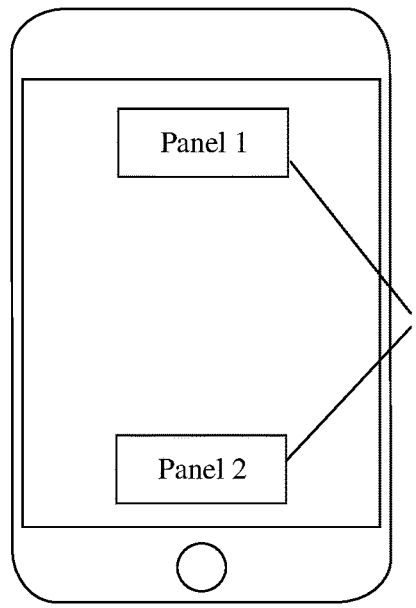
Figure 3C:
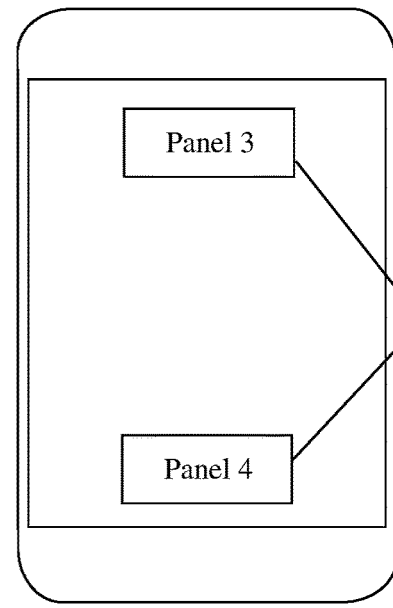

FIG. 3C shows a scenario in which the N transmission units are located on the plurality of panels whose directions are different. It is assumed that the N transmission units are located on a panel 1, a panel 2, a panel 3, and a panel 4. The panel and the panel 2 are located on a front face of a terminal, and face a first direction. The panel 3 and the panel 4 are located on a back face of the terminal, and face a second direction. In the N transmission units, there are a total of $N_{first\ direction}$ transmission unis on the panel 1 and the panel 2, and there are a total of $N_{second\ direction}$ transmission unis on the panel 3 and the panel 4. In this scenario, a precoding operation cannot be performed in a cross-panel direction, to be specific, after layer mapping is performed on data, the data cannot be mapped to transmission ports corresponding to the N transmission units at the same time through precoding.

Figure 4:
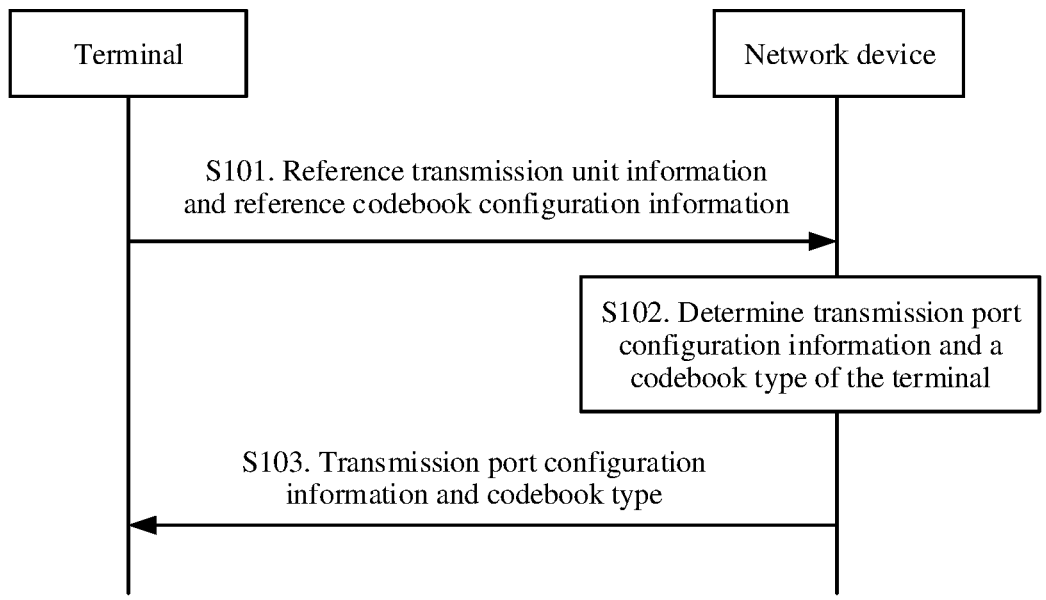
FIG. 4 is a schematic flowchart of an NR uplink codebook configuration method according to this application.
Figure 5:
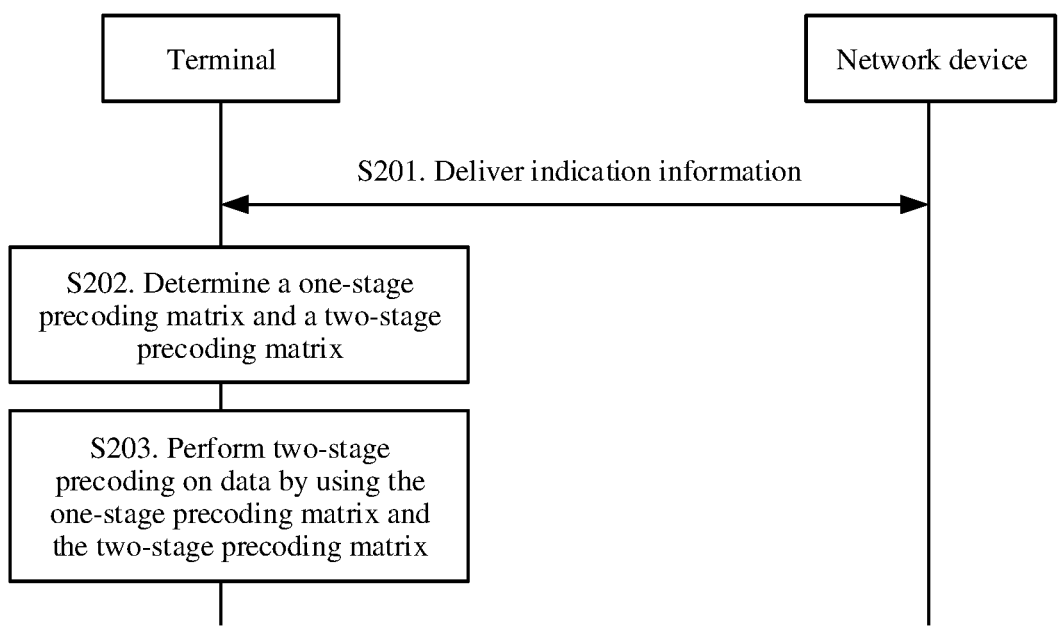
FIG. 5 is a schematic flowchart of performing precoding by using a two-stage codebook according to this application.
Figure 6:
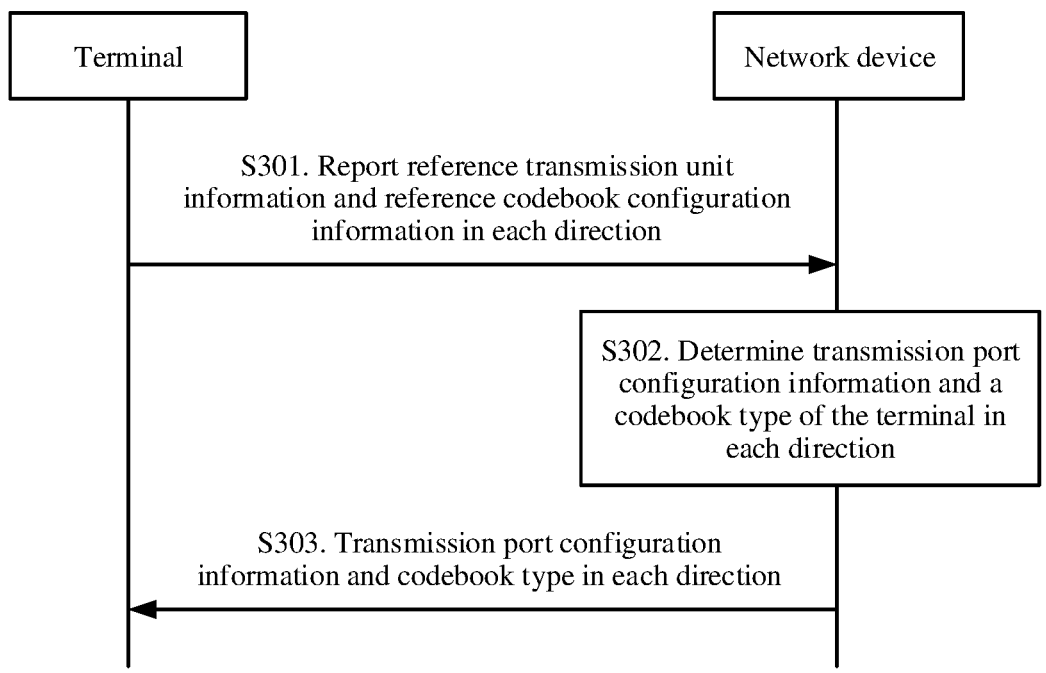
FIG. 6 is a schematic flowchart of another NR uplink codebook configuration method according to this application.

First, the NR uplink codebook configuration method in this application is described for the first case and the second case. Refer to FIG. 4 to FIG. 6.

FIG. 4 is a flowchart of an NR uplink codebook configuration method according to this application. The method is applicable to the first case and the second case. According to this method, an NR uplink codebook can be designed. The method may include the following steps.

S101. A terminal reports reference transmission unit configuration information and reference codebook configuration information to a network device.

Herein, the terminal may report the reference transmission unit configuration information and the reference codebook configuration information together to the network device, or may separately report the reference transmission unit configuration information and the reference codebook configuration information. This is not limited in this application.

Specifically, the reference transmission unit information includes: a quantity N of transmission units, a quantity M, recommended by the terminal, of groups into which the N transmission units are divided, and a quantity of transmission units included in each group. A quantity of transmission units included in an $r^{th}$ group is $N_r$, and 1≤r≤M. Generally, when the terminal recommends that the N transmission units should be grouped, correlation between transmission units in each group is relatively high. It should be noted that M may be equal to 1 or may be equal to N.

In an optional embodiment, when reporting the reference transmission unit information to the network device, the terminal may directly report, to the network device, the quantity of transmission units, the quantity of groups, and the quantity of transmission units included in each group. The first case is used as an example. The terminal may directly report, to the network device, the quantity N of transmission units, the quantity M of groups, and the quantity of transmission units included in each group, such as $N_1$, $N_2$, $N_3$, ..., or $N_M$.

In an optional embodiment, the terminal and the network device both store a reference transmission unit information table. Table 8 shows an example of a possible form. In this case, each index corresponds to one piece of reference transmission unit information, and the terminal may notify the network device of the reference transmission unit information by reporting only an index to the network device.

TABLE 8

| Index | Quantity N of transmission units | Quantity M of groups | Quantity of transmission units included in each group |
|---|---|---|---|
| 1 | N1 | M1 | $N1_1, N1_2, \ldots,$ or $N1_{M1}$ |
| 2 | N2 | M2 | $N2_1, N2_2, \ldots,$ or $N2_{M2}$ |
| G | NG | MG | $NG_1, NG_2, \ldots,$ or $NG_{MG}$ |

In the foregoing table, a value of G is determined by a specific quantity of possible reference transmission unit configuration manners.

Specifically, there are the following two possibilities for the reference codebook configuration information.

In a first optional embodiment, the reference codebook configuration information includes a codebook reference type. A detailed description is provided in the following.

When M≠1 and M≠N, the codebook reference type includes a one-stage codebook reference type and a two-stage codebook reference type. The one-stage codebook reference type and the two-stage codebook reference type each may be any one or more of the foregoing DFT codebook type, phase codebook type, Householder codebook type, port selection codebook type, or first combination codebook type. It may be understood that generally, the one-stage codebook type is the DFT codebook type, and the two-stage codebook type may be any one or more of the phase codebook type, the Householder codebook type, the port selection codebook type, or the first combination codebook type.

When M=1 or M=N, the codebook reference type includes a single-stage codebook reference type. The single-stage codebook reference type may be any one or more of the foregoing DFT codebook type, phase codebook type, Householder codebook type, port selection codebook type, or first combination codebook type.

In a second optional embodiment, the reference codebook configuration information includes correlation information.

When M≠1 and M≠N, the correlation information includes one-stage correlation and two-stage correlation. The one-stage correlation is intra-group correlation of each of the M groups of transmission units, and the two-stage correlation is inter-group correlation of the M groups of transmission units. The one-stage correlation and the two-stage correlation each may be any one of high, medium, and low. Further, the one-stage correlation and the two-stage correlation may be further divided into finer granularities, for example, very high, relatively high, medium, relatively low, and very low. This is not limited in this application. Correlation is related to a distance between transmission units. Refer to the foregoing description. Details are not described herein. It may be understood that in most cases, the one-stage correlation is high, and the two-stage correlation is medium or low.

When M=1 or M=N, the correlation information includes single-stage correlation. The single-stage correlation is correlation among the N transmission units. Similar to the foregoing one-stage correlation or two-stage correlation, the single-stage correlation may be any one of high, medium, and low, or may be divided into finer granularities. This is not described herein.

S102. The network device determines transmission port configuration information of the terminal based on the reference transmission unit configuration information, and determines a codebook type of the terminal based on the reference codebook configuration information.

Specifically, after receiving the reference transmission unit information reported by the terminal in the first case or the second case, the network device may determine the transmission port configuration information of the terminal based on the reference transmission unit information.

In the reference transmission unit information reported by the terminal, when M≠1 and M≠N, the transmission port configuration information determined by the network device may include one or more of the following configuration information:

(1) a quantity n of transmission ports configured for the terminal, where n≤N, and if the quantity n of transmission ports is not configured, it is considered that n=N by default; and (2) a quantity m of groups into which the n transmission ports are divided, and a quantity of transmission ports included in each group, where a quantity of transmission ports included in a $t^{th}$ group is $n_t$, and 1≤t≤m; and optionally, the transmission port configured by the network device for the terminal is an SRS port that may be used to measure CSI.

In an optional embodiment, the quantity of transmission ports configured by the network device for the terminal is the same as the quantity of transmission units reported by the terminal, and transmission port information determined by the network device is similar to the reference transmission unit information, to be specific, N=n, and M=m. In another optional embodiment, the transmission port information determined by the network device is different from the reference transmission unit information, to be specific, N≠n and/or M≠m.

When M=1 or M=N in the reference transmission unit information reported by the terminal, the transmission port configuration information of the terminal that is determined by the network device may include the quantity n of transmission ports configured for the terminal, where n≤N. If the quantity n of transmission ports is not configured, it is considered that n=N by default. Optionally, the transmission port configured by the network device for the terminal is an SRS port that may be used to measure CSI.

In an optional embodiment, when subsequently sending the determined transmission port information to the terminal, the network device may directly send, to the terminal, the quantity of transmission ports, the quantity of groups, and the quantity of transmission units included in each group. For example, the network device may directly send, to the terminal, the following parameters: the quantity n of transmission ports, the quantity m of groups, and the quantity of transmission ports included in each group, such as $n_1$, $n_2$, $n_3$, ..., or $n_m$.

In an optional embodiment, the terminal and the network device both store a transmission port configuration information table similar to Table 5. When sending the transmission port information to the terminal, the network device may notify the terminal of the transmission port configuration information by using an index in the table.

Specifically, after receiving the reference codebook configuration information reported by the terminal in the first case or the second case, the network device may determine the codebook type and a codebook parameter of the terminal based on the reference codebook configuration information.

When M≠1 and M≠N in the reference transmission unit information reported by the terminal, the codebook type determined by the network device includes a single-stage codebook type. The single-stage codebook type is used by the terminal to determine a codebook used to precode the n transmission ports.

When M=1 or M=N in the reference transmission unit information reported by the terminal, the codebook type determined by the network device includes a one-stage codebook type and a two-stage codebook type. The one-stage codebook type is used by the terminal to determine a codebook used to perform intra-group precoding on each of the m groups of transmission ports, and the two-stage codebook type is used by the terminal to determine a codebook used to perform inter-group precoding on the m groups of transmission ports.

Herein, the intra-group precoding means precoding $n_1$ transmission ports included in a first group by using a precoding matrix whose rank is $Q_1$, precoding $n_2$ transmission ports included in a second group by using a precoding matrix whose rank is $Q_2$, precoding $n_3$ transmission ports included in a third group by using a precoding matrix whose rank is $Q_3, \ldots$, and precoding $n_m$ transmission ports included in an $m^{th}$ group by using a precoding matrix whose rank is $Q_m$. Herein, performing inter-group precoding on the m groups of transmission ports may be considered as precoding Q newly generated transmission ports. Apparently, $Q=\Sigma_{q=1}^{m} Q_q$, and $Q_q$ represents a rank of a precoding matrix used by the terminal to perform intra-group precoding on a $q^{th}$ group of transmission ports.

Specifically, when the network device determines the codebook type of the terminal based on the reference codebook configuration information, there are different operations in two possible implementations of the reference codebook configuration information. A detailed description is provided in the following.

In a first optional embodiment, when $M \neq 1$ and $M \neq N$, and the reference codebook configuration information reported by the terminal includes the one-stage codebook reference type and the two-stage codebook reference type, the network device determines, based on the reporting of the terminal, that the one-stage codebook type of the terminal is any one of the one-stage codebook reference type and the two-stage codebook type of the terminal is any one of the two-stage codebook reference type.

When $M=1$ or $M=N$, and the reference codebook configuration information reported by the terminal includes the single-stage codebook reference type, the network device determines, based on the reporting of the terminal, that the single-stage codebook type of the terminal is any one of the single-stage codebook reference type.

In a second optional embodiment, when $M \neq 1$ and $M \neq N$, and the reference codebook configuration information includes the one-stage correlation and the two-stage correlation, and when the one-stage correlation is high, the network device may determine that the one-stage codebook type is the DFT codebook type; or when the one-stage correlation is medium or low, the network device may determine that the one-stage codebook type is the phase codebook type, the Householder codebook type, the port selection codebook type, or the first combination codebook type. Similar to the foregoing description, when the two-stage correlation is high, the network device may determine that the two-stage codebook type is the DFT codebook type; or when the two-stage correlation is medium or low, the network device may determine that the one-stage codebook type is the phase codebook type, the Householder codebook type, the port selection codebook type, or the first combination codebook type.

In a specific embodiment, when the one-stage correlation is medium or low, and a quantity of transmission ports included in each of the m groups of transmission ports is less than or equal to 3, the network device may determine that the one-stage codebook type is the phase codebook type; or when the one-stage correlation is medium or low, and a quantity of transmission ports included in each of the m groups of transmission ports is less than or equal to 4, the network device may determine that the one-stage codebook type is the Householder codebook type.

In a specific embodiment, when the two-stage correlation is medium or low, and the quantity m of groups is 2 or 3, the network device may determine that the two-stage codebook type is the phase codebook type; or when the two-stage correlation is medium or low, and the quantity m of groups is 3 or 4, the network device may determine that the two-stage codebook type is the Householder codebook type.

It may be understood that in most cases, the one-stage correlation is high, the two-stage correlation is low, the one-stage codebook type determined by the network device for the terminal is the DFT codebook type, and the two-stage codebook type determined by the network device for the terminal is the Householder codebook type, or a combination type of the port selection codebook and the phase codebook.

When $M=1$ or $M=N$, and the reference codebook configuration information includes the single-stage correlation, and when the single-stage correlation is high, the network device may determine that the single-stage codebook type is the DFT codebook type; or when the single-stage correlation is medium or low, the network device may determine that the single-stage codebook type is the phase codebook type, the Householder codebook type, the port selection codebook type, or the first combination codebook type.

In an optional embodiment, the network device may further determine a configuration parameter of each codebook type based on configuration of the foregoing codebook types (the one-stage codebook type and the two-stage codebook type, or the single-stage codebook type) and current determining of a channel propagation environment and according to a principle of reducing precoding matrix indicator overheads, to be specific, considering a quantity of bits of a transmitted precoding matrix index (transmit precoding matrix index, TPMI). The configuration parameter includes one or more of the following parameters.

(1) If the codebook type determined by the network device for the terminal includes a DFT codebook, the configuration parameter includes an over-sampling multiple, namely, an over-sampling factor.

(2) If the network device configures a two-stage codebook for the terminal, and a one-stage codebook is a DFT codebook, a manner of calculating a precoding matrix in the DFT codebook is configured.

(3) If the network device configures a two-stage codebook for the terminal, and a one-stage codebook is a DFT codebook, a quantity of DFT beams that need to be output in each group is configured, to be specific, a quantity of ranks in each group is configured.

(4) If the codebook type determined by the network device for the terminal includes a DFT codebook, an optional subset of precoding matrices is configured.

(5) If the network device configures a two-stage codebook for the terminal, and the two-stage codebook is a first combination codebook, an optional subset of precoding matrices of the first combination codebook is configured.

In an optional embodiment, the terminal and the network device both store a configuration information table in which optional codebook types and corresponding codebook parameters are defined. The network device may configure codebook types for the terminal and specific codebook parameters based on the definition in the configuration information table. Table 9 is an example table.

TABLE 9

| Index | Single-stage codebook/ Two-stage codebook | Codebook type | Supported port | Quantity of precoding matrices | Another configuration |
|---|---|---|---|---|---|
| 1 | Single stage | Householde codebook type/Phase codebook type | 2 to 4 | Refer to Table 2, Table 3, or Table 4. | N/A |
| 2 | Single stage | Port selection codebook type | 2 or 4 | Refer to Table 5 or Table 6. | 2-port p = 1 4-port p = 2 |
| 3 | Two stages | One-stage: a DFT codebook type; and two-stage: a first combination codebook type | 4 or 8 | One-stage: 8 or 16; and two-stage: 4 or 2 | One-stage: precoding matrices are divided into two groups, a rank is 1 or a rank is 2 in each group, and TPMIs of the two groups of precoding matrices are the same; an over-sampling factor is 4 or 2; and optional subsets of precoding matrices included in the one-stage codebook and the two-stage codebook |
| 4 | Two stages | One-stage: a port selection codebook type; and two-stage: a phase codebook type | 3 or 4 | One-stage: 4 or 2; and two-stage: 4 | N/A |
| ... | ... | ... | ... | ... | ... |

Based on Table 9, a specific design embodiment of a 4-port two-stage codebook corresponding to an index 3 is provided as follows.

Four ports are divided into two groups, and the two groups are precoded by using a same intra-group precoding matrix.

A one-stage uses a DFT codebook type. In this case, a 2-port DFT codebook is used for each group of transmission ports. An over-sampling factor is 4, and a quantity of precoding matrices included when ranks are different is expressed as: $L = O \times y = 4 \times 2 = 8$.

In the 2-port DFT codebook, eight precoding matrices included when a rank is 1 are as follows:

$$\begin{bmatrix} 1 \\ 1 \end{bmatrix}, \begin{bmatrix} 1 \\ e^{j\frac{\pi}{4}} \end{bmatrix}, \begin{bmatrix} 1 \\ j \end{bmatrix}, \begin{bmatrix} 1 \\ e^{j\frac{3\pi}{4}} \end{bmatrix}, \begin{bmatrix} 1 \\ -1 \end{bmatrix}, \begin{bmatrix} 1 \\ e^{j\frac{5\pi}{4}} \end{bmatrix}, \begin{bmatrix} 1 \\ -j \end{bmatrix}, \begin{bmatrix} 1 \\ e^{j\frac{7\pi}{4}} \end{bmatrix}$$

In the 2-port DFT codebook, eight precoding matrices included when a rank is 2 are as follows:

$$\begin{bmatrix} 1 & 1 \\ 1 & e^{j\frac{\pi}{4}} \end{bmatrix}, \begin{bmatrix} 1 & 1 \\ e^{j\frac{\pi}{4}} & j \end{bmatrix}, \begin{bmatrix} 1 & 1 \\ j & e^{j\frac{3\pi}{4}} \end{bmatrix}, \begin{bmatrix} 1 & 1 \\ e^{j\frac{3\pi}{4}} & -1 \end{bmatrix},$$

-continued $$\begin{bmatrix} 1 & 1 \\ -1 & e^{j\frac{5\pi}{4}} \end{bmatrix}, \begin{bmatrix} 1 & 1 \\ e^{j\frac{5\pi}{4}} & -j \end{bmatrix}, \begin{bmatrix} 1 & 1 \\ -j & e^{j\frac{7\pi}{4}} \end{bmatrix}, \begin{bmatrix} 1 & 1 \\ e^{j\frac{7\pi}{4}} & 1 \end{bmatrix}$$

The eight precoding matrices selected when the rank is 2 are obtained by performing column combination on precoding matrices whose precoding matrix indexes are consecutive and that are obtained when the rank is 1. The precoding matrix indexes are consecutive, to be specific, directions of the precoding matrices are similar. An advantage lies in that it is considered that digital beamforming is performed on some ports that have undergone analog beamforming, channel angular spread is limited by an analog beam, and therefore, the precoding matrices with similar directions are selected.

The network device may send the index 3 in Table 9 to the terminal. In a case of the index 3, a same precoding matrix in a same codebook is used for the two groups of transmission ports during one-stage precoding. It can be learned that the network device can indicate, to the terminal by using 3-bit signaling overheads, a precoding matrix index used during the one-stage precoding.

A two-stage uses a first combination codebook.

When determining the first combination codebook, the network device needs to indicate specific configuration information to the terminal. A detailed description is provided in the following.

Because a rank of the two-stage determines a rank of the entire codebook, it needs to be discussed separately.

When a rank of a two-stage codebook is equal to 1, there is a restriction that a set of precoding matrices when a rank is 1 is used for a one-stage codebook. Therefore, a precoding matrix selected in a port selection codebook part of the first combination codebook is a single element matrix including one element "1", and does not need to be indicated. A precoding matrix selected in a phase codebook part of the first combination codebook may be selected from the four precoding matrices when the rank is 1 in Table 2, and needs to be indicated by using two bits.

When a rank of a two-stage codebook is equal to 2, there is a restriction that a set of precoding matrices when a rank is 2 is used for a one-stage codebook. Therefore, A precoding matrix selected in a port selection codebook part of the first combination codebook may be selected from the precoding matrices when the rank is 2 in Table 5, and $\tilde{c}_{d1}$, $\tilde{c}_{d2}$, $\tilde{c}_{d3}$, and $\tilde{c}_{d4}$ each may be indicated by using one bit. A precoding matrix selected in a phase codebook part of the first combination codebook may be selected from the two precoding matrices when the rank is equal to 2 in Table 2, and is indicated by using one bit. Because there is a restriction that precoding matrices in the two groups are the same, in the port codebook selection part of the first combination codebook, $\tilde{c}_{d1}=\tilde{c}_{d2}$, and $\tilde{c}_{d3}=\tilde{c}_{d4}$. Further, the following two options exist.

Option 1: further, there is a restriction that a precoding matrix index of $\tilde{c}_{d1}$ is 0. In this way, only one bit is required to indicate selection of $\tilde{c}_{d3}$ in total.

Option 2: further, there is a restriction that $\tilde{c}_{d1}=\tilde{c}_{d3}$. In this way, only one bit is required to indicate selection of $\tilde{c}_{d1}$ in total.

Therefore, the two-stage needs to be indicated by using two bits.

Based on the foregoing design, it can be ensured that only a maximum of two bits are required for indicating a TPMI of a sub-band of the two-stage. In this way, system overheads can be effectively reduced.

In an optional design, in a one-stage wideband indication, in addition to indicating precoding matrix selection in a DFT codebook, optionally, one bit is added to indicate that the foregoing option 1 or option 2 is selected, so that a TPMI indication is applicable to channel propagation environments in different angular spread scenarios.

In addition, the network device may further configure a subband width of each stage for the single-stage codebook or the two-stage codebook based on current determining of a channel propagation environment. On the same subband, precoding matrices in this stage are the same, and may be indicated together. On different subbands, precoding matrices may be different and need to be separately indicated. Generally, if m>1, to be specific, a two-stage codebook is used, a first subband width configured for a one-stage intra-group codebook is greater than a second subband width configured for a two-stage inter-group codebook, namely, a subband width configured for an inter-group codebook. The first subband width and the second subband width may be configured by the network device and/or specified in a protocol.

In an optional embodiment, sending timings (timing) for the network device to deliver one-stage indication information and two-stage indication information to the terminal are different, and the network device may configure, based on a current channel propagation environment, the sending timing, that is, a first indication interval $T_1$, for delivering the one-stage indication information, and the sending timing, that is, a second indication interval $T_2$, for delivering the two-stage indication information. Generally, a sending time of the two-stage indication information does not need to be configured, and the network device delivers the two-stage indication information to the terminal in each piece of uplink scheduling control information. The network device needs to configure the sending timing of the one-stage indication information, for example, may configure that the network device sends the one-stage indication information to the terminal in a first piece of uplink scheduling control information each time uplink scheduling is performed, or sends the one-stage indication information to the terminal at an interval of a fixed subframe or slot. $T_1$, and $T_2$ are configured by the network device and/or specified in a protocol.

S103. The network device sends the transmission port configuration information and the codebook type to the terminal.

In an optional embodiment, the network device may directly send, to the terminal, the quantity of transmission ports, the quantity of groups, and the quantity of transmission units included in each group. For example, the network device may directly send, to the terminal, the following parameters: the quantity n of transmission ports, the quantity m of groups, and the quantity of transmission ports included in each group, such as $n_1$, $n_2$, $n_3$, ..., or $n_m$.

In an optional embodiment, the terminal and the network device both store a transmission port configuration information table similar to Table 5. When sending the transmission port information to the terminal, the network device may notify the terminal of the transmission port configuration information by using an index in the table.

In an optional embodiment, the network device may send a codebook type configuration to the terminal. Optionally, the network device may further send a specific codebook configuration parameter based on the codebook type to the terminal.

In an optional embodiment, the network device may notify the terminal of the codebook type and the specific codebook parameter by using a table index. The terminal and the network device both store a configuration information table in which optional codebook types and corresponding codebook parameters are defined. Table 9 is an example table, and details are not described herein.

In an optional embodiment, the network device may send a subband width configuration and/or a subband timing configuration to the terminal.

After the method embodiment shown in FIG. 3 is implemented, the network device and the terminal jointly complete the design solution of the two-stage codebook, and the designed codebook is applicable to an NR scenario. It may be understood that the method shown in FIG. 3 is more applicable to an NR 6-100 GHz high frequency band.

After the codebook design method shown in FIG. 4 is implemented, the codebook type, the transmission port configuration, and the codebook parameter configuration for NR uplink precoding are determined between the network device and the terminal. The following describes in detail a specific operation of transmitting uplink data by using a codebook designed and configured in this application in NR. FIG. 5 is a schematic flowchart of performing precoding by using a two-stage codebook according to this application, that is, an m>1 case. The precoding process may include the following steps.

S201. The network device delivers indication information to the terminal, where the indication information includes one-stage indication information and two-stage indication information.

Specifically, the one-stage indication information includes a precoding matrix indicator and a rank indicator that correspond to each of the m groups of transmission ports or a precoding matrix indicator that corresponds to each of the m groups of transmission ports. A rank of a one-stage codebook may be determined based on a codebook configuration. Therefore, the one-stage codebook may not require a rank indicator, and the indication information includes only a precoding matrix indicator. For example, in a case of the index 3 in Table 9, rank information does not need to be indicated. The two-stage indication information includes a precoding matrix indicator and a rank indicator that correspond to the m groups of transmission ports. The precoding matrix indicator may be a precoding matrix index.

S202. The terminal determines a precoding matrix based on the indication information.

Specifically, the terminal determines a one-stage precoding matrix based on the one-stage indication information, and determines a two-stage precoding matrix based on the two-stage indication information.

In the method embodiment shown in FIG. 4, the terminal receives the transmission port configuration information, the one-stage codebook type, and the two-stage codebook type that are sent by the network device.

The terminal determines the one-stage codebook based on the transmission port configuration information, the one-stage codebook type, and the codebook configuration parameter. Specifically, codebooks corresponding to the m groups of transmission ports are separately determined based on the one-stage codebook type and the quantities $n_1$, $n_2$, ..., and $n_m$ of transmission ports included in the m groups of transmission ports in the transmission port configuration information. For example, when the one-stage codebook type is a DFT codebook type, a codebook used by the terminal to perform intra-group precoding on an $r^{th}$ group of transmission ports is an $n_r$-port DFT codebook. Similarly, when the one-stage codebook type is the phase codebook type, a codebook used by the terminal to perform intra-group precoding on an $r^{th}$ group of transmission ports is an $n_r$-port phase codebook. When the one-stage codebook type is the Householder codebook type, a codebook used by the terminal to perform intra-group precoding on an $r^{th}$ group of transmission ports is an $n_r$-port Householder codebook.

After determining the used one-stage codebook, the terminal determines the one-stage precoding matrix based on the one-stage indication information. Specifically, a precoding matrix used to perform intra-group precoding on each of the m groups of transmission ports is determined based on the one-stage indication information. Specifically, an example in which the codebook that is used for intra-group precoding on the $r^{th}$ group of transmission ports and is determined by the terminal is the $n_r$-port DFT codebook is used. The terminal may find a corresponding precoding matrix in the $n_r$-port DFT codebook based on a precoding matrix indicator (that is, a precoding matrix index) and a rank that correspond to the $r^{th}$ group of transmission ports. The rank may be indicated in downlink control information (downlink control information, DCI), or may be provided in the codebook configuration parameter.

Similarly, the terminal determines the two-stage codebook based on the transmission port configuration information, the two-stage codebook type, and the codebook configuration parameter. Specifically, a codebook used for inter-group precoding is determined based on the quantity m of groups in the transmission port configuration information. For example, when the two-stage codebook type is a combination type of a port selection codebook and a phase codebook, a codebook used by the terminal to perform inter-group precoding on the m groups of transmission ports is a Q-port phase codebook, where $Q=\Sigma_{q=1}^{m}Q_q$, and $Q_q$ represents a rank of a precoding matrix used by the terminal to perform intra-group precoding on a $q^{th}$ group of transmission ports.

When the two-stage codebook type is a Householder codebook type, a codebook used by the terminal to perform inter-group precoding on the m groups of transmission ports is a y-port Householder codebook.

After determining the used two-stage codebook, the terminal determines the two-stage precoding matrix based on the two-stage indication information. Specifically, a precoding matrix used to perform inter-group precoding on the m groups of transmission ports is determined based on the two-stage indication information. Specifically, an example in which the two-stage codebook determined by the terminal is an $n_r$-port phase codebook is used. The terminal may find a corresponding precoding matrix in the $n_r$-port phase codebook based on a precoding matrix indicator (that is, a precoding matrix index) and a rank indicator that correspond to the m groups of transmission ports.

S203. The terminal performs two-stage precoding on data by using the one-stage precoding matrix and the two-stage precoding matrix.

Optionally, after step S203, the terminal may send a data stream on which two-stage encoding has been performed to the network device; and the network device may perform channel estimation by using a reference signal using a same precoding matrix as a data signal, and then perform a decoding operation on the received data stream, so as to obtain original data and complete a communication process. An advantage of performing precoding by the terminal by using the precoding matrix indicated by the network device lies in that the network device can accurately determine a channel status of an uplink based on another uplink reference signal, and further determine and indicate uplink precoding of the terminal based on a codebook, so as to implement optimal uplink multiple-antenna transmission.

It may be understood that in NR, a specific operation of transmitting uplink data by using the single-stage codebook designed in this application is similar to that in the embodiment shown in FIG. 5. For details, refer to the implementation. Details are not described herein.

The foregoing describes in detail the NR uplink codebook configuration method in this application in the first case and the second case. The following briefly describes an NR uplink codebook configuration method in this application in the third case.

In the third case, the N transmission units are located on the plurality of panels, and the directions of the plurality of panels are different. In this case, an operation in the NR uplink codebook configuration method in this application is separately performed for different directions by considering the directions of the plurality of panels. A codebook design in each direction is similar to that in the embodiment shown in FIG. 4. A brief description is provided in the following.

FIG. 6 is a flowchart of an NR uplink codebook configuration method according to this application. The method is applicable to the third case. According to this method, an NR uplink codebook can be designed. The method may include the following steps.

S301. The terminal reports reference transmission unit configuration information and reference codebook configuration information in each direction to the network device.

The following uses a specific scenario shown in FIG. 3C as an example for description.

The terminal reports reference transmission unit information and corresponding reference codebook configuration information in a first direction.

The reference transmission unit information in the first direction includes: a quantity $N_{first\ direction}$ of transmission units, a quantity $M_{first\ direction}$, recommended by the terminal, of groups into which the $N_{first\ direction}$ transmission units are divided, and a quantity of transmission units included in each group. It should be noted that $M_{first\ direction}$ may be equal to 1 or may be equal to N.

There are the following two possibilities for the reference codebook configuration information in the first direction.

In a first optional embodiment, the reference codebook configuration information includes a codebook reference type. When $M_{first\ direction} \neq 1$ and $M_{first\ direction} \neq N$, the codebook reference type includes a one-stage codebook reference type and a two-stage codebook reference type. When $M_{first\ direction} = 1$ or $M_{first\ direction} = N$, the codebook reference type includes a single-stage codebook reference type.

In a second optional embodiment, the reference codebook configuration information includes correlation information. When $M_{first\ direction} \neq 1$ and $M_{first\ direction} \neq N$, the correlation information includes one-stage correlation and two-stage correlation. When $M_{first\ direction} = 1$ or $M_{first\ direction} = N$, the codebook reference type includes single-stage correlation.

Similarly, the terminal reports reference transmission unit information and corresponding reference codebook configuration information in a second direction. The reference transmission unit information in the second direction includes: a quantity $N_{second\ direction}$ of transmission units, a quantity $M_{second\ direction}$, recommended by the terminal, of groups into which the $N_{second\ direction}$ transmission units are divided, and a quantity of transmission units included in each group. It should be noted that $M_{second\ direction}$ may be equal to 1 or may be equal to N.

The reference codebook configuration information in the second direction is similar to that in the first direction, and details are not described herein.

S302. The network device determines transmission port configuration information of the terminal in each direction based on the reference transmission unit configuration information in each direction, and determines a codebook type of the terminal in each direction based on the reference codebook configuration information in each direction.

In an optional embodiment, the network device may further determine a specific codebook parameter in each direction. Specifically, in each direction, operations of determining the transmission port configuration information, the codebook type, and the specific codebook parameter by the network device are similar to those in the method embodiment in FIG. 4. For details, refer to the foregoing description. Details are not described herein.

S303. The network device sends the transmission port configuration information in each direction and the codebook type in each direction to the terminal.

According to the method embodiment shown in FIG. 6, the network device and the terminal jointly complete design solutions for two-stage codebooks in different panel directions, and the designed codebooks are applicable to an NR scenario. It may be understood that the method shown in FIG. 6 is more applicable to an NR 6-100 GHz high frequency band.

After the codebook design method shown in FIG. 6 is implemented, the terminal may perform two-stage precoding in each direction based on the transmission port configuration information in each direction and the codebook type in each direction that are sent by the network device. Precoding performed in each direction is similar to that in the method embodiment shown in FIG. 5. Details are not described herein.

The foregoing describes in detail the method in this application. To better implement the foregoing solution in this application, this application further provides a corresponding apparatus.

Figure 7:
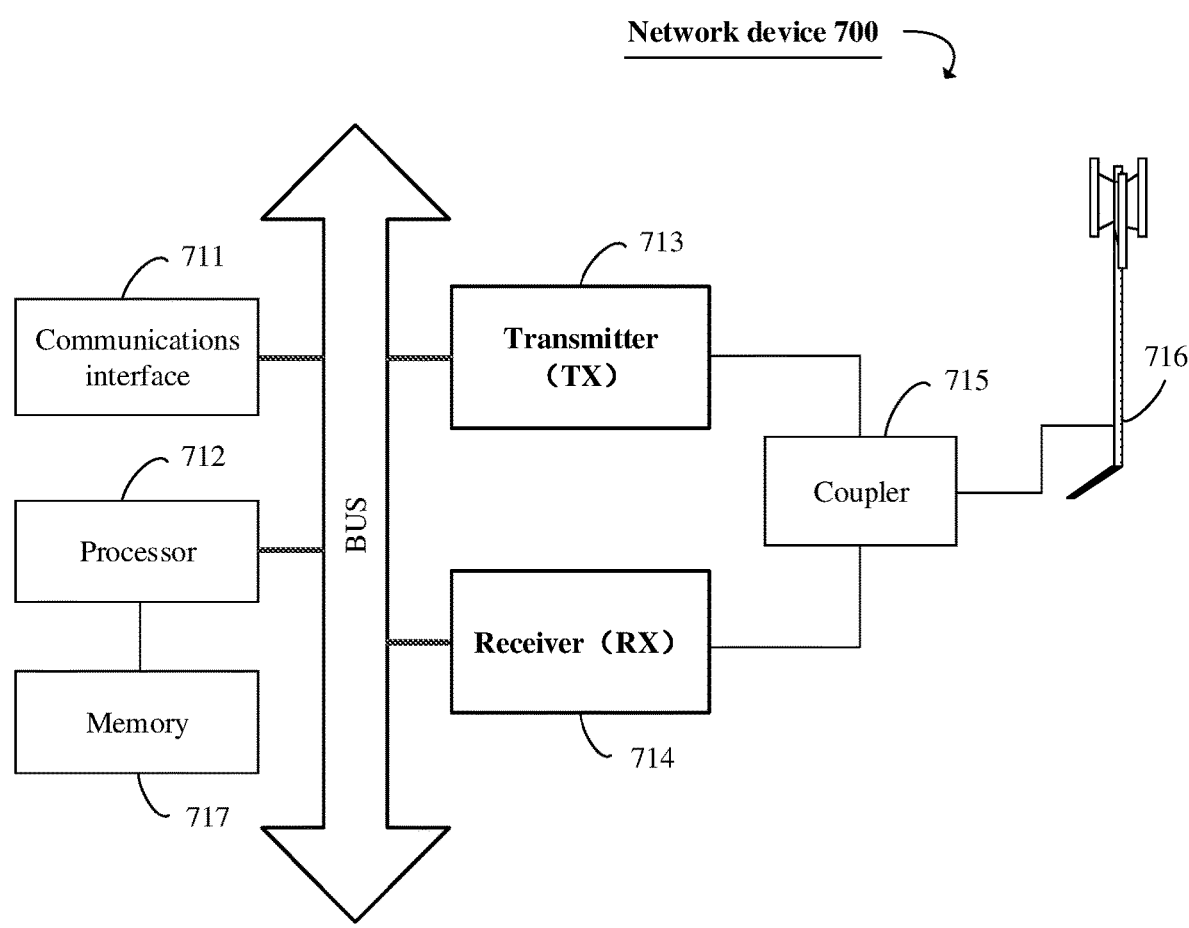
FIG. 7 is a hardware structural diagram of a network device according to this application.

FIG. 7 is a structural block diagram of an implementation of a network device 700 according to this application. The network device may include a communications interface 711, one or more processors 712, a transmitter 713, a receiver 714, a coupler 715, an antenna 716, and a memory 717. These components may be connected through a bus or in another manner. In FIG. 7, an example in which a bus is used for connection is used.

The communications interface 711 may be configured to perform communication between the network device 700 and another communications device, for example, a terminal or another network device. In specific implementation, the communications interface 711 may be a network communications interface, such as an LTE (4G) communications interface or a 5G or future new radio communications interface. In addition to a wireless communications interface, the network device 700 may be further configured with a wired communications interface to support wired communications.

The antenna 716 may be configured to convert electromagnetic energy in a transmission line into an electromagnetic wave in free space, or convert an electromagnetic wave in free space into electromagnetic energy in a transmission line. The coupler 715 may be configured to divide a communication signal into a plurality of signals, and allocate the plurality of signals to a plurality of receivers 714.

The transmitter 713 may be configured to transmit a signal output by the processor 712, to transmit the signal to the terminal or the another network device. The receiver 714 may be configured to receive a signal received by the antenna 716, to receive the signal transmitted by the terminal or the another network device. There may be one or more transmitters 713 and one or more receivers 714.

In this application, the transmitter 713 is configured to send transmission port configuration information and a codebook type to the terminal.

The memory 717 is coupled to the processor 712, and is configured to store various software programs and/or a plurality of groups of instructions. In specific implementation, the memory 717 may include a high-speed random access memory, or may include a non-volatile memory, for example, one or more magnetic storage devices, one or more flash memory devices, or another non-volatile solid state storage device. The memory 717 may store an operating system (hereinafter referred to as a system), for example, an embedded operating system such as uCOS, VxWorks, or RTLinux. The memory 717 may further store a network communications program. The network communications program may be configured to communicate with one or more additional devices, one or more terminal devices, or one or more network devices.

In some embodiments of this application, the memory 717 may be configured to store a program for implementing the NR uplink codebook configuration method on the side of the network device 700 and store a plurality of tables mentioned in this application. For implementation of the NR uplink codebook configuration method provided in one or more embodiments of this application, refer to the foregoing embodiments.

The processor 712 may include an administration module/a communications module (Administration Module/ Communication Module, AM/CM) (a center for speech path switching and information exchange), a basic module (Basic Module, BM) (configured to complete functions of call processing, signaling processing, radio resource management, radio link management, and circuit maintenance), a transcoder and submultiplexer (Transcoder and SubMultiplexer, TCSM) (configured to complete functions of multiplexing/demultiplexing and transcoding), and the like.

In this application, the processor 712 may be configured to read and execute a computer-readable instruction. Specifically, the processor 712 may be configured to: invoke the program stored in the memory 717, for example, the program for implementing the NR uplink codebook configuration method provided in one or more embodiments of this application on the side of the network device 700; and execute an instruction included in the program.

In specific implementation, the network device 700 may be implemented by a base transceiver station, a radio transceiver, a basic service set (BSS), an extended service set (ESS), a NodeB, an eNodeB, or the like. The network device 700 may be implemented by several different types of base stations, such as a macro base station and a micro base station.

It should be noted that the network device 700 shown in FIG. 7 is merely an implementation of this application. In actual application, the network device 700 may alternatively include more or fewer components. This is not limited herein.

Figure 8:
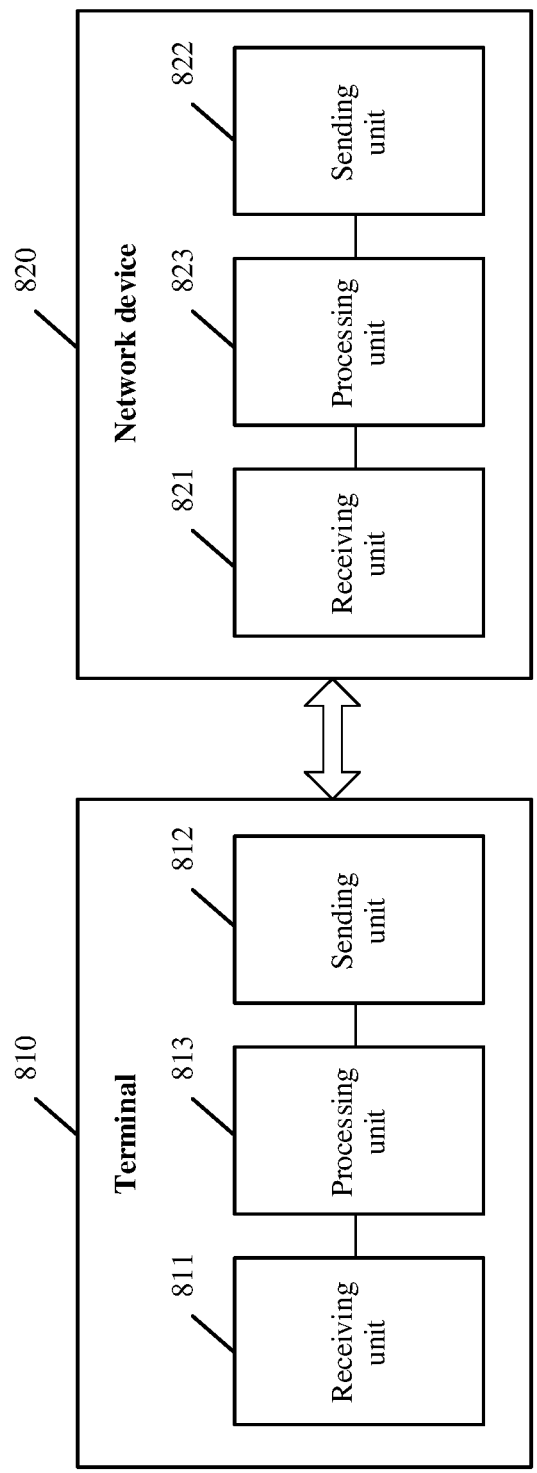
FIG. 8 is a schematic structural diagram of a terminal and a network device according to an embodiment of this application.

FIG. 8 is a schematic structural diagram of a terminal 810 and a network device 820 according to this application.

First, the terminal 810 may include a receiving unit 811, a sending unit 812, and a processing unit 813.

The processing unit 813 is configured to determine reference transmission unit configuration information and reference codebook configuration information, where the reference transmission unit configuration information includes: a quantity N of transmission units of the terminal, a quantity M of groups into which the N transmission units are divided, and a quantity of transmission units included in each group.

The sending unit 812 is configured to report the reference transmission unit configuration information and the reference codebook configuration information to the network device.

The receiving unit 811 is configured to receive transmission port configuration information and a codebook type of the terminal that are delivered by the network device, where the transmission port configuration information is determined by the network device based on the reference transmission unit configuration information, and the codebook type is determined by the network device based on the reference codebook configuration information.

Second, the network device 820 may include a receiving unit 821, a sending unit 822, and a processing unit 823.

The receiving unit 821 is configured to receive the reference transmission unit configuration information reported by the terminal, where the reference transmission unit configuration information includes: the quantity N of transmission units of the terminal, the quantity M of groups into which the N transmission units are divided, and the quantity of transmission units included in each group.

The processing unit 823 is configured to determine the transmission port configuration information of the terminal based on the reference transmission unit configuration information.

The receiving unit 821 is further configured to receive the reference codebook configuration information reported by the terminal.

The processing unit 823 is further configured to determine the codebook type of the terminal based on the reference codebook configuration information.

The sending unit 822 is configured to send the transmission port configuration information and the codebook type to the terminal.

For the reference transmission unit configuration information, the reference codebook configuration information, the transmission port configuration information, and the codebook type, refer to related descriptions in the method embodiment in FIG. 4. For function implementation of each functional unit of the terminal 810 and the network device 820, refer to the method embodiments shown in FIG. 4 to FIG. 6. Details are not described herein.

In addition, this application further provides a communications system. The communications system may include a terminal and a network device. The terminal may be the terminal in the method embodiments shown in FIG. 4 to FIG. 6, and the network device may be the network device in the method embodiments shown in FIG. 4 to FIG. 6.

In specific implementation, the terminal may be a first terminal shown in FIG. 1A or FIG. 8, and the network device may be the network device shown in FIG. 7 or FIG. 8. For specific implementation of the first terminal and the network device, refer to the foregoing related content. Details are not described herein.

It can be learned from the foregoing that according to the NR uplink codebook configuration method provided in this application, two-stage codebooks or single codebooks adapted to different antenna array forms on a terminal side in an NR scenario can be designed for an NR communications system.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An uplink codebook configuration method for communication between a network device and a terminal, comprising:
    receiving, by the network device, reference transmission unit configuration information reported by the terminal, wherein the reference transmission unit configuration information comprises: a quantity N of transmission units of the terminal, a quantity M of groups into which the N transmission units are divided, and a quantity of transmission units in each group;
    determining transmission port configuration information of the terminal based on the reference transmission unit configuration information;
    receiving reference codebook configuration information reported by the terminal;

determining a codebook type of the terminal based on the reference codebook configuration information; and sending the transmission port configuration information and the codebook type to the terminal.

2. The method according to claim 1, wherein the transmission port configuration information comprises: a quantity n of transmission ports configured for the terminal, a quantity m of groups into which the n transmission ports are divided, and a quantity of transmission ports comprised in each group.

3. The method according to claim 2, wherein the reference codebook configuration information comprises a one-stage codebook reference type and a two-stage codebook reference type, and the codebook type of the terminal comprises a one-stage codebook type and a two-stage codebook type; and the determining a codebook type of the terminal based on the reference codebook configuration information comprises: determining that the one-stage codebook type of the terminal is any one of the one-stage codebook reference type and the two-stage codebook type of the terminal is any one of the two-stage codebook reference type; wherein the one-stage codebook reference type comprises any one or more of a DFT codebook type, a phase codebook type, a Householder codebook type, or a first combination codebook type; and the two-stage codebook reference type comprises any one or more of a DFT codebook type, a phase codebook type, a Householder codebook type, or a first combination codebook type.

4. The method according to claim 3, wherein the one-stage codebook type is used by the terminal to determine a codebook used to perform intra-group precoding on each of the m groups of transmission ports, and the two-stage codebook type is used by the terminal to determine a codebook used to perform inter-group precoding on the m groups of transmission ports.

5. The method according to claim 2, wherein the reference codebook configuration information comprises one-stage correlation and two-stage correlation, the one-stage correlation is intra-group correlation of each of the M groups of transmission units, the two-stage correlation is inter-group correlation of the M groups of transmission units, and the codebook type of the terminal comprises a one-stage codebook type and a two-stage codebook type; and the determining a codebook type of the terminal based on the reference codebook configuration information comprises:

when the one-stage correlation is high, determining that the one-stage codebook type is a DFT codebook type; or when the one-stage correlation is medium or low, determining that the one-stage codebook type is a phase codebook type, a Householder codebook type, or a first combination codebook type; and when the two-stage correlation is high, determining that the two-stage codebook type is a DFT codebook type; or when the two-stage correlation is medium or low, determining that the two-stage codebook type is a phase codebook type, a Householder codebook type, or a first combination codebook type.

6. The method according to claim 2, wherein the method further comprises:

delivering, by the network device, one-stage indication information and two-stage indication information to the terminal, wherein the one-stage indication information comprises at least a precoding matrix indicator that corresponds to each of the m groups of transmission ports; and the two-stage indication information comprises a precoding matrix indicator and a rank indicator that correspond to the m groups of transmission ports.

7. A network device, comprising: a receiver, a transmitter, and at least one processor, wherein the receiver is configured to receive reference transmission unit configuration information from a terminal, wherein the reference transmission unit configuration information comprises: a quantity N of transmission units of the terminal, a quantity M of groups into which the N transmission units are divided, and a quantity of transmission units comprised in each group;

the at least one processor is configured to determine transmission port configuration information of the terminal based on the reference transmission unit configuration information;

the receiver is further configured to receive reference codebook configuration information from the terminal;

the at least one processor is further configured to determine a codebook type of the terminal based on the reference codebook configuration information; and the transmitter is configured to send the transmission port configuration information and the codebook type to the terminal.

8. The network device according to claim 7, wherein the transmission port configuration information comprises: a quantity n of transmission ports configured for the terminal, a quantity m of groups into which the n transmission ports are divided, and a quantity of transmission ports in each group.

9. The network device according to claim 8, wherein the reference codebook configuration information comprises a one-stage codebook reference type and a two-stage codebook reference type, and the codebook type of the terminal comprises a one-stage codebook type and a two-stage codebook type; and that the at least one processor is further configured to determine a codebook type of the terminal comprises: determining that the one-stage codebook type of the terminal is any one of the one-stage codebook reference type and the two-stage codebook type of the terminal is any one of the two-stage codebook reference type; wherein the one-stage codebook reference type comprises any one or more of a DFT codebook type, a phase codebook type, a Householder codebook type, or a first combination codebook type; and the two-stage codebook reference type comprises any one or more of a DFT codebook type, a phase codebook type, a Householder codebook type, or a first combination codebook type.

10. The network device according to claim 9, wherein the one-stage codebook type is used by the terminal to determine a codebook used to perform intra-group precoding on each of the m groups of transmission ports, and the two-stage codebook type is used by the terminal to determine a codebook used to perform inter-group precoding on the m groups of transmission ports.

11. The network device according to claim 8, wherein the reference codebook configuration information comprises one-stage correlation and two-stage correlation, the one-stage correlation is intra-group correlation of each of the M groups of transmission units, the two-stage correlation is inter-group correlation of the M groups of transmission units, and the codebook type of the terminal comprises a one-stage codebook type and a two-stage codebook type; and the at least one processor is further configured to: when the one-stage correlation is high, determine that the one-stage codebook type is a DFT codebook type; or when the one-stage correlation is medium or low, determine that the one-stage codebook type is a phase codebook type, a Householder codebook type, or a first combination codebook type; and when the two-stage correlation is high, determine that the two-stage codebook type is a DFT codebook type; or when the two-stage correlation is medium or low, determine that the two-stage codebook type is a phase codebook type, a Householder codebook type, or a first combination codebook type.

12. The network device according to claim 8, wherein the transmitter is further configured to deliver one-stage indication information and two-stage indication information to the terminal, wherein he one-stage indication information comprises at least a precoding matrix indicator that corresponds to each of the m groups of transmission ports; and the two-stage indication information comprises a precoding matrix indicator and a rank indicator that correspond to the m groups of transmission ports.

13. The network device according to claim 12, wherein that the transmitter is further configured to deliver one-stage indication information and two-stage indication information to the terminal comprises: the transmitter is further configured to deliver the one-stage indication information to the terminal based on a first subband width and a first indication interval $T_1$; and deliver the two-stage indication information to the terminal based on a second subband width and a second indication interval $T_2$; wherein the first subband width is greater than or equal to the second subband width, $T_1 > T_2$ and the first subband width, the second subband width, $T_1$, and $T_2$ are determined by the processing unit and/or specified in a protocol.

14. A terminal, comprising: a receiver, a transmitter, and at least one processor, wherein the at least one processor is configured to determine reference transmission unit configuration information and reference codebook configuration information, wherein the reference transmission unit configuration information comprises: a quantity N of transmission units of the terminal, a quantity M of groups into which the N transmission units are divided, and a quantity of transmission units comprised in each group;

the transmitter is configured to report the reference transmission unit configuration information and the reference codebook configuration information to a network device; and the receiver is configured to receive transmission port configuration information and a codebook type of the terminal from the network device, wherein the transmission port configuration information is determined by the network device based on the reference transmission unit configuration information, and the codebook type is determined by the network device based on the reference codebook configuration information.

15. The terminal according to claim 14, wherein the transmission port configuration information comprises: a quantity n of transmission ports configured for the terminal, a quantity m of groups into which the n transmission ports are divided, and a quantity of transmission ports comprised in each group.

16. The terminal according to claim 15, wherein the reference codebook configuration information comprises a one-stage codebook reference type and a two-stage codebook reference type; the one-stage codebook reference type comprises any one or more of a DFT codebook type, a phase codebook type, a Householder codebook type, or a first combination codebook type; and the two-stage codebook reference type comprises any one or more of a DFT codebook type, a phase codebook type, a Householder codebook type, or a first combination codebook type;

the codebook type received by the receiver comprises a one-stage codebook type and a two-stage codebook type; and the one-stage codebook type is any one of the one-stage codebook reference type, and the two-stage codebook type is any one of the two-stage codebook reference type.

17. The terminal according to claim 16, wherein he one-stage codebook type is used by the at least one processor to determine a codebook used to perform intra-group precoding on each of the m groups of transmission ports, and the two-stage codebook type is used by the at least one processor to determine a codebook used to perform inter-group precoding on the m groups of transmission ports.

18. The terminal according to claim 15, wherein the receiver is further configured to receive one-stage indication information and two-stage indication information from the network device, wherein he one-stage indication information comprises at least a precoding matrix indicator that corresponds to each of the m groups of transmission ports; and the two-stage indication information comprises a precoding matrix indicator and a rank indicator that correspond to the m groups of transmission ports.

19. The terminal according to claim 18, wherein that the receiver is further configured to receive one-stage indication information and two-stage indication information from the network device comprises: the receiver is specifically configured to receive the one-stage indication information from the network device to the terminal based on a first subband width and a first indication interval $T_1$; and receive the two-stage indication information that is transmitted by the network device to the terminal based on a second subband width and a second indication interval $T_2$; wherein the first subband width is greater than or equal to the second subband width, $T_1 > T_2$, and the first subband width, the second subband width, $T_1$, and $T_2$ are configured by the network device and/or specified in a protocol.

20. The terminal according to claim 15, wherein the reference codebook configuration information comprises one-stage correlation and two-stage correlation, the one-stage correlation is intra-group correlation of each of the M groups of transmission units, and the two-stage correlation is inter-group correlation of the M groups of transmission units; and the one-stage correlation comprises any one of high, medium, and low, and the two-stage correlation comprises any one of high, medium, and low;

the codebook type received by the receiver comprises a one-stage codebook type and a two-stage codebook type;

when the one-stage correlation is high, the one-stage codebook type is a DFT codebook type; or when the one-stage correlation is medium or low, the one-stage codebook type is a phase codebook type, a Householder codebook type, or a first combination codebook type; and when the two-stage correlation is high, the two-stage codebook type is a DFT codebook type; or when the two-stage correlation is medium or low, the two-stage codebook type is a phase codebook type, a Householder codebook type, or a first combination codebook type.

* * * * *